US010955960B2

(12) United States Patent
Saito et al.

(10) Patent No.: US 10,955,960 B2
(45) Date of Patent: Mar. 23, 2021

(54) CONTROL DEVICE, CONTROL METHOD, AND PROGRAM

(71) Applicant: SONY MOBILE COMMUNICATIONS INC., Tokyo (JP)

(72) Inventors: Yuichiro Saito, Tokyo (JP); Tomoki Hamajima, Tokyo (JP); Hirotsugu Kitamori, Tokyo (JP); Shinji Matsuda, Tokyo (JP); Hiroya Kudo, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/418,902

(22) Filed: Jan. 30, 2017

(65) Prior Publication Data
US 2017/0244943 A1 Aug. 24, 2017

(30) Foreign Application Priority Data
Feb. 19, 2016 (JP) .............................. JP2016-030248

(51) Int. Cl.
*H04N 9/31* (2006.01)
*G06F 3/041* (2006.01)
*G06F 3/042* (2006.01)
*G06F 3/0484* (2013.01)
*G06F 3/0488* (2013.01)

(52) U.S. Cl.
CPC .......... *G06F 3/0416* (2013.01); *G06F 3/0421* (2013.01); *G06F 3/0425* (2013.01); *G06F 3/0426* (2013.01); *G06F 3/04842* (2013.01); *G06F 3/04845* (2013.01); *G06F 3/04883* (2013.01); *H04N 9/3185* (2013.01); *H04N 9/3194* (2013.01)

(58) Field of Classification Search
CPC .... G06F 3/0416; G06F 3/0421; G06F 3/0425; G06F 3/04842; G06F 3/04845; G06F 3/04883; G06F 3/017; G06F 3/035; H04N 9/3173; H04N 9/3179; H04N 9/3185; H04N 9/3194
See application file for complete search history.

(56) References Cited

U.S. PATENT DOCUMENTS 7,824,039 B2 * 11/2010 Takito ................... G03B 21/10
345/156
8,018,579 B1 * 9/2011 Krah ..................... G01B 11/00
356/4.01
(Continued)

FOREIGN PATENT DOCUMENTS

EP 2 634 629 A1 9/2013
EP 2 711 809 A2 3/2014
(Continued)

OTHER PUBLICATIONS

European Office Action dated Aug. 30, 2018 in European Application No. 17155583.2-1216.

*Primary Examiner* — Sardis F Azongha
(74) *Attorney, Agent, or Firm* — Xsensus LLP

(57) ABSTRACT

There is provided a control device including: a projection control unit configured to control projection of an image on a projection plane by a projector; and a UI control unit configured to switch a mode of a user interface (UI) related to the projected image between two or more UI modes based on a positional relationship of the projector with respect to the projection plane.

18 Claims, 22 Drawing Sheets

(56) References Cited

U.S. PATENT DOCUMENTS

| | | | |
|---|---|---|---|
| 8,727,540 B2* | 5/2014 | Ehara | G03B 21/145 |
| | | | 345/11 |
| 9,229,584 B2* | 1/2016 | Ide | G06F 3/017 |
| 9,465,484 B1 | 10/2016 | Kamarshi et al. | |
| 9,619,104 B2* | 4/2017 | Xin | G06F 3/017 |
| 2008/0212039 A1 | 9/2008 | Taylor | |
| 2009/0077504 A1 | 3/2009 | Bell et al. | |
| 2009/0122271 A1 | 5/2009 | Nagashima et al. | |
| 2009/0128716 A1 | 5/2009 | Nagashima et al. | |
| 2010/0199232 A1* | 8/2010 | Mistry | G06F 1/163 |
| | | | 715/863 |
| 2011/0188008 A1* | 8/2011 | Maeda | G03B 21/28 |
| | | | 353/85 |
| 2011/0242506 A1* | 10/2011 | Uchiyama | G03B 21/14 |
| | | | 353/98 |
| 2012/0035934 A1* | 2/2012 | Cunningham | G06F 1/1639 |
| | | | 704/260 |
| 2012/0098865 A1 | 4/2012 | Takano et al. | |
| 2012/0287044 A1 | 11/2012 | Bell et al. | |
| 2012/0313974 A1 | 12/2012 | Ueno et al. | |
| 2013/0016070 A1 | 1/2013 | Starner et al. | |
| 2013/0142383 A1 | 6/2013 | Viswanathan et al. | |
| 2013/0222228 A1* | 8/2013 | Walker | G06F 3/017 |
| | | | 345/156 |
| 2014/0078516 A1 | 3/2014 | Hirai | |
| 2015/0185859 A1* | 7/2015 | Yamamoto | G06F 3/017 |
| | | | 345/156 |
| 2015/0268799 A1 | 9/2015 | Starner et al. | |
| 2015/0346835 A1 | 12/2015 | Bell et al. | |
| 2017/0031530 A1* | 2/2017 | Ikeda | H04N 9/3179 |
| 2017/0329458 A1* | 11/2017 | Kanemaru | G06F 3/0425 |

FOREIGN PATENT DOCUMENTS

| | | |
|---|---|---|
| EP | 2 711 809 A3 | 3/2014 |
| JP | 2003-44839 | 2/2003 |
| WO | WO 2009/035705 A1 | 3/2009 |
| WO | WO 2013/009482 A2 | 1/2013 |
| WO | 2016/017296 | 2/2016 |

* cited by examiner

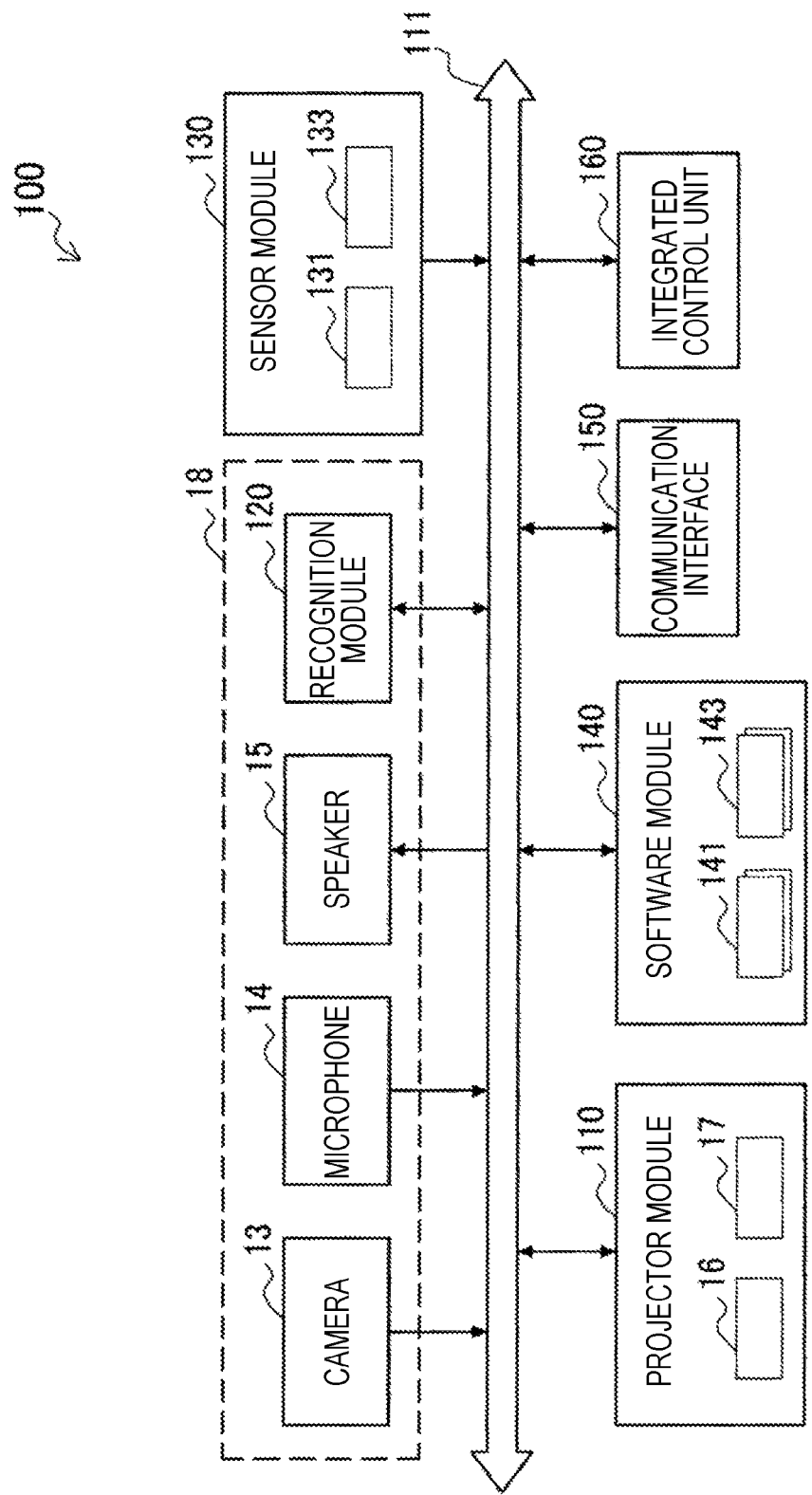

TOUCH MODE     NON-TOUCH MODE

TOUCH MODE          NON-TOUCH MODE

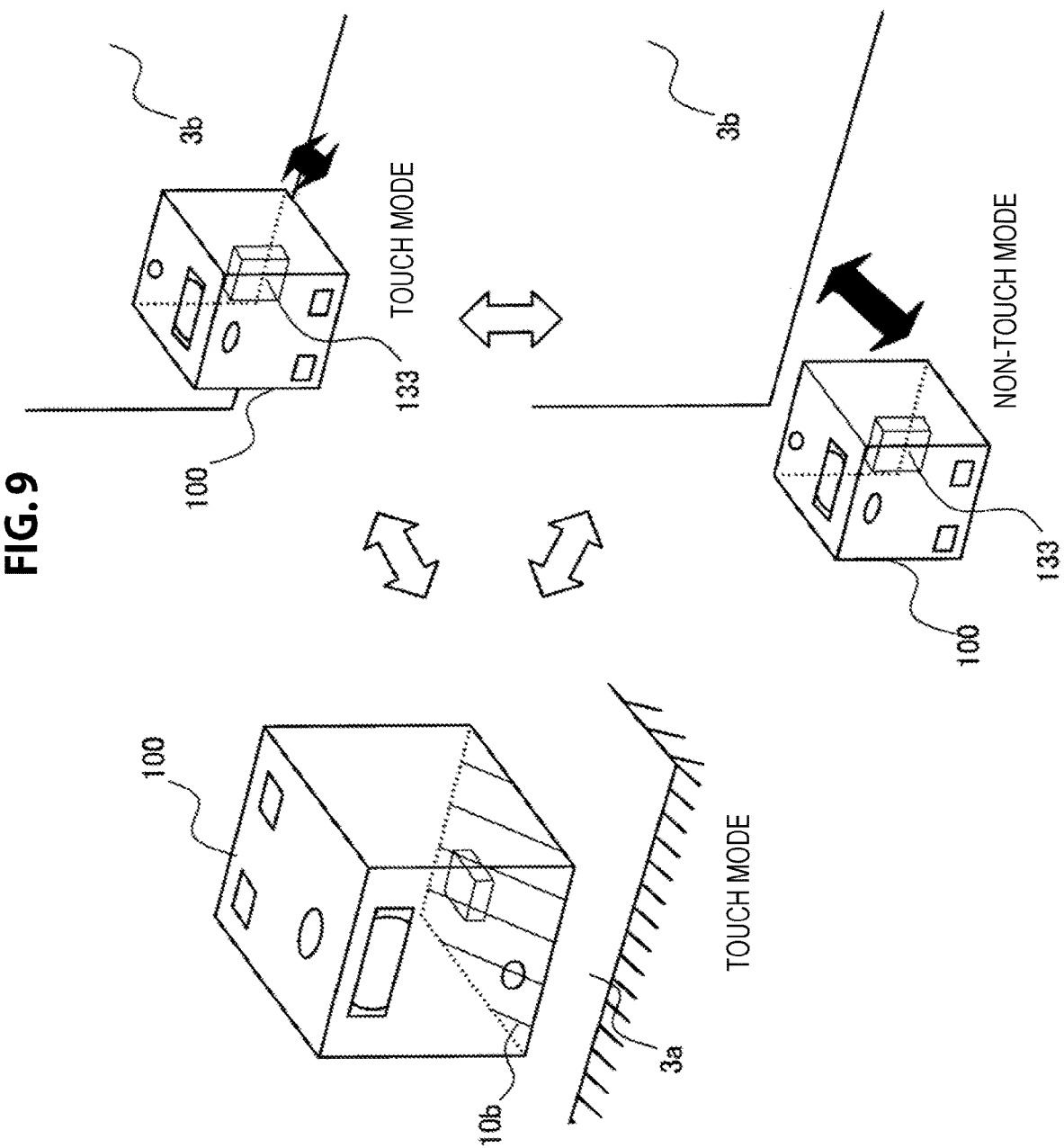

FIG. 14
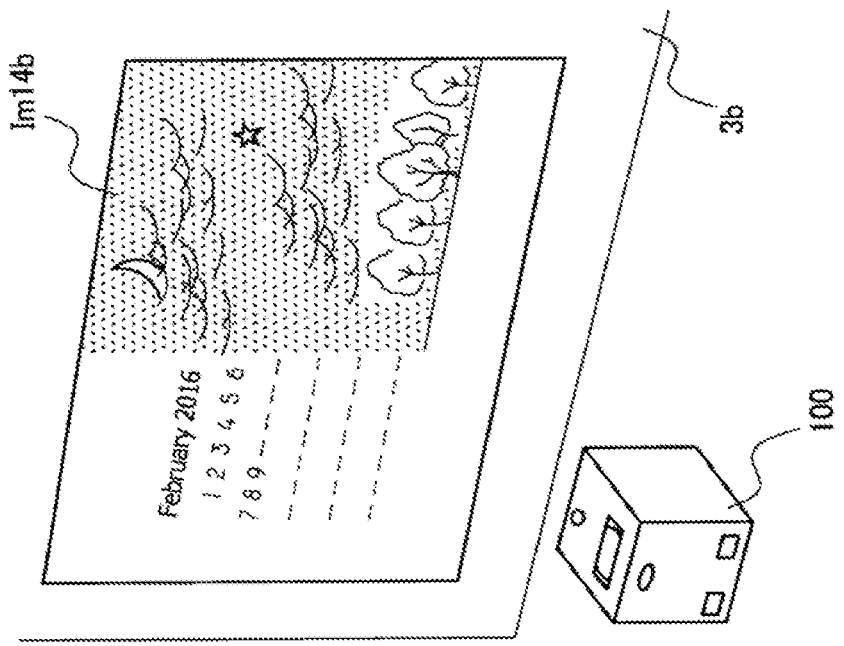
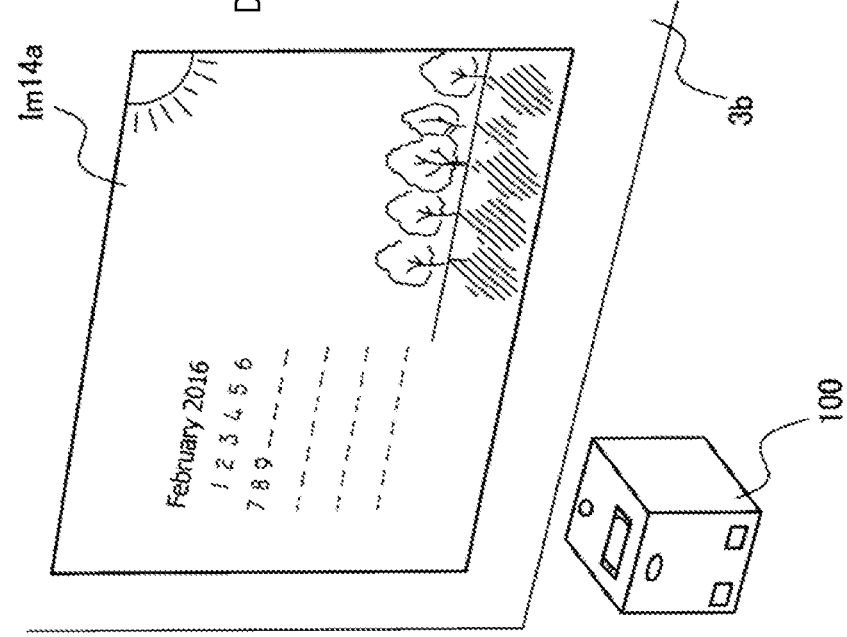

CONTROL DEVICE, CONTROL METHOD, AND PROGRAM

CROSS REFERENCE TO RELATED APPLICATIONS

This application claims the benefit of Japanese Priority Patent Application JP 2016-030248 filed Feb. 19, 2016, the entire contents of which are incorporated herein by reference.

BACKGROUND

The present disclosure relates to a control device, a control method, and a program.

Projectors that project images on projection planes are known in the related art. JP 2003-044839A has proposed a technique of not only merely projecting an image on a projection plane to show it to a user, but also acquiring information written by the user on the projection plane through a camera and recording the acquired information on the projected image with a link.

SUMMARY

The inventors of the technology of the present disclosure have recognized that the technique proposed in JP 2003-044839A is also applicable to a user interface that operates through a projection image. However, there are various opinions on what type of user interface is desirable depending on a place on which images are to be projected.

According to an embodiment of the present disclosure, there is provided a control device including: a projection control unit configured to control projection of an image on a projection plane by a projector; and a UI control unit configured to switch a mode of a user interface (UI) related to the projected image between two or more UI modes based on a positional relationship of the projector with respect to the projection plane.

According to an embodiment of the present disclosure, there is provided a control method for a projection control device configured to control projection of an image on a projection plane by a projector, the control method including: switching a mode of a user interface (UI) related to the projected image between two or more UI modes based on a positional relationship of the projector with respect to the projection plane.

According to an embodiment of the present disclosure, there is provided a program for causing a processor of a projection control device to function as: a projection control unit configured to control projection of an image on a projection plane by a projector; and a UI control unit configured to switch a mode of a user interface (UI) related to the projected image between two or more UI modes based on a positional relationship of the projector with respect to the projection plane.

According to the technology related to the present disclosure, a desirable type of user interface suitable for a positional relationship of a projector with respect to a projection plane can be provided to users.

Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 7 is a block diagram illustrating an example of a configuration of a projection control device according to an embodiment of the present disclosure;

FIG. 9 shows illustrative diagrams for describing a third example of switching of UI modes based on positional relationships of a projector with respect to a projection plane;

FIG. 14 is an illustrative diagram for describing an example of a projection image changing based on an input condition that does not depend on a user input;

DETAILED DESCRIPTION OF THE EMBODIMENT(S)

Figure 1:
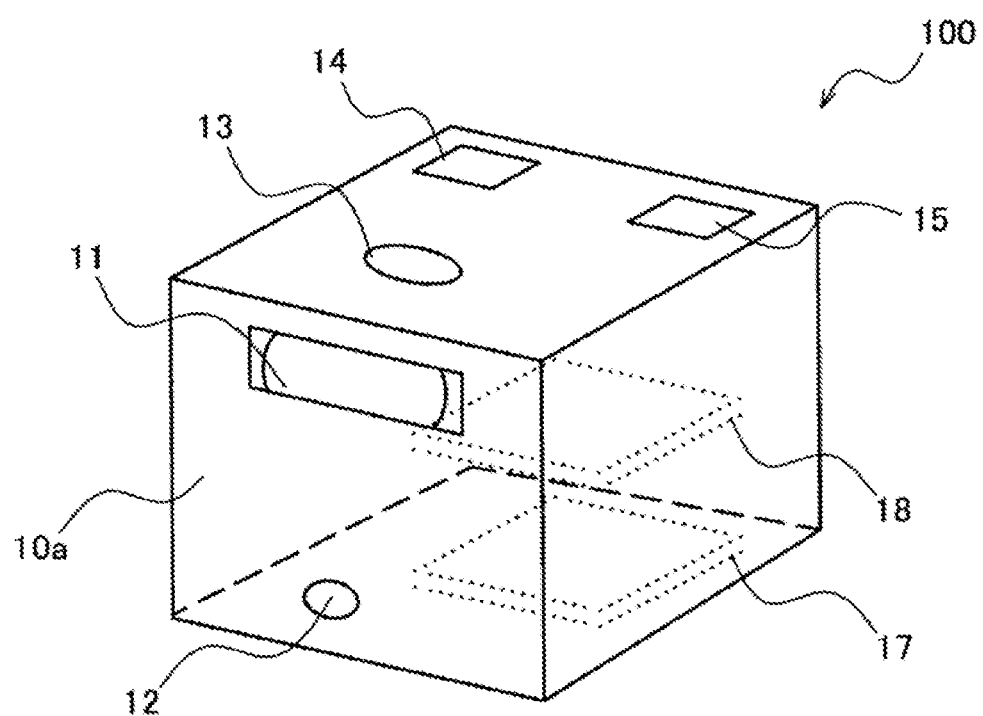
FIG. 1 is a schematic diagram illustrating an external appearance of a projection control device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, description will be provided in the following order.

1. Overview of device
1-1. External appearance of device
1-2. Various installation attitudes
1-3. Mechanism of touch input detection system
2. Configuration of device
2-1. Overall configuration
2-2. Switch of UI mode
2-3. Example of user input
2-4. Input condition that does not depend on user input
3. Process flow
3-1. UI control process
3-2. UI mode selection process
4. Conclusion <1. Overview of Device>

[1-1. External Appearance of Device]

FIG. 1 illustrates an external appearance of a projection control device 100 according to an embodiment of the present disclosure. The projection control device 100 is a so-called projector that projects images on a projection plane presented outside of the device. In the example of FIG. 1, the projection control device 100 has a cuboid shape, and thus can be placed on any plane with any surface thereof as a bottom. Note that the shape of the projection control device 100 illustrated in FIG. 1 is merely an example. The projection control device 100 may have any shape as long as it can be stably installed in a real space.

One surface of a housing of the projection control device 100 is an emission plane 10a. The emission plane 10a includes a projection light opening 11 and a search light opening 12. The projection control device 100 further has a camera 13, a microphone 14, and a speaker 15. The projection control device 100 projects projection light toward the projection plane through the projection light opening 11, and thereby forms a projection image on the projection plane. In addition, the projection control device 100 emits search light toward a search area in the vicinity of the projector through the search light opening 12 to detect a touch input by a user as will be described below in detail.

In the present embodiment, the projection control device 100 is provided with two user input detection systems 17 and 18. The first user input detection system 17 detects touch inputs of a user using the above-described search light with relatively high detection accuracy. The second user input detection system 18 may have lower touch detection accuracy than the first user input detection system, or may be incapable of detecting touches. The second user input detection system 18 may detect, for example, inputs of gestures from the user based on images captured by the camera 13, or detect inputs of sounds from the user based on sound collected by the microphone 14.

[1-2. Various Installation Attitudes]

The projection control device 100 can be installed in a real space in various installation attitudes. In this section, two typical installation attitudes of the projection control device 100 will be described.

Figure 2A:
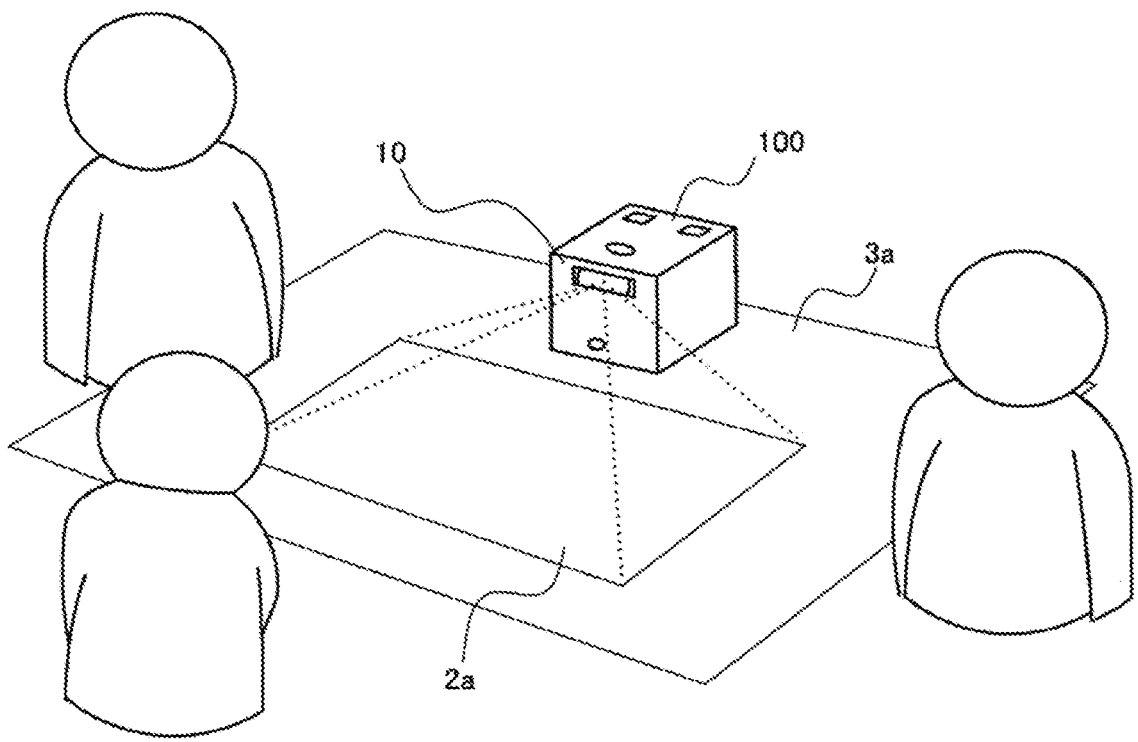
FIG. 2A is an illustrative diagram for describing a first installation attitude of the projection control device.

FIG. 2A is an illustrative diagram for describing a first installation attitude of the projection control device 100. Referring to FIG. 2A, the projection control device 100 is placed on a table surface 3a in a first installation attitude. In the first installation attitude, the emission plane 10a of the projection control device 100 is substantially orthogonal to the table surface 3a serving as an installation plane. That is, when the table surface 3a is a horizontal plane, the emission plane 10a is a vertical plane with respect thereto. In the first installation attitude, the projection control device 100 can project a projection image 2a on the table surface 3a. In this case, the table surface 3a serves as a projection plane below the projection control device 100. In the example of FIG. 2A, three users are surrounding a table, and thus each of the users can view the projection image 2a formed on the table surface 3a.

Figure 2B:
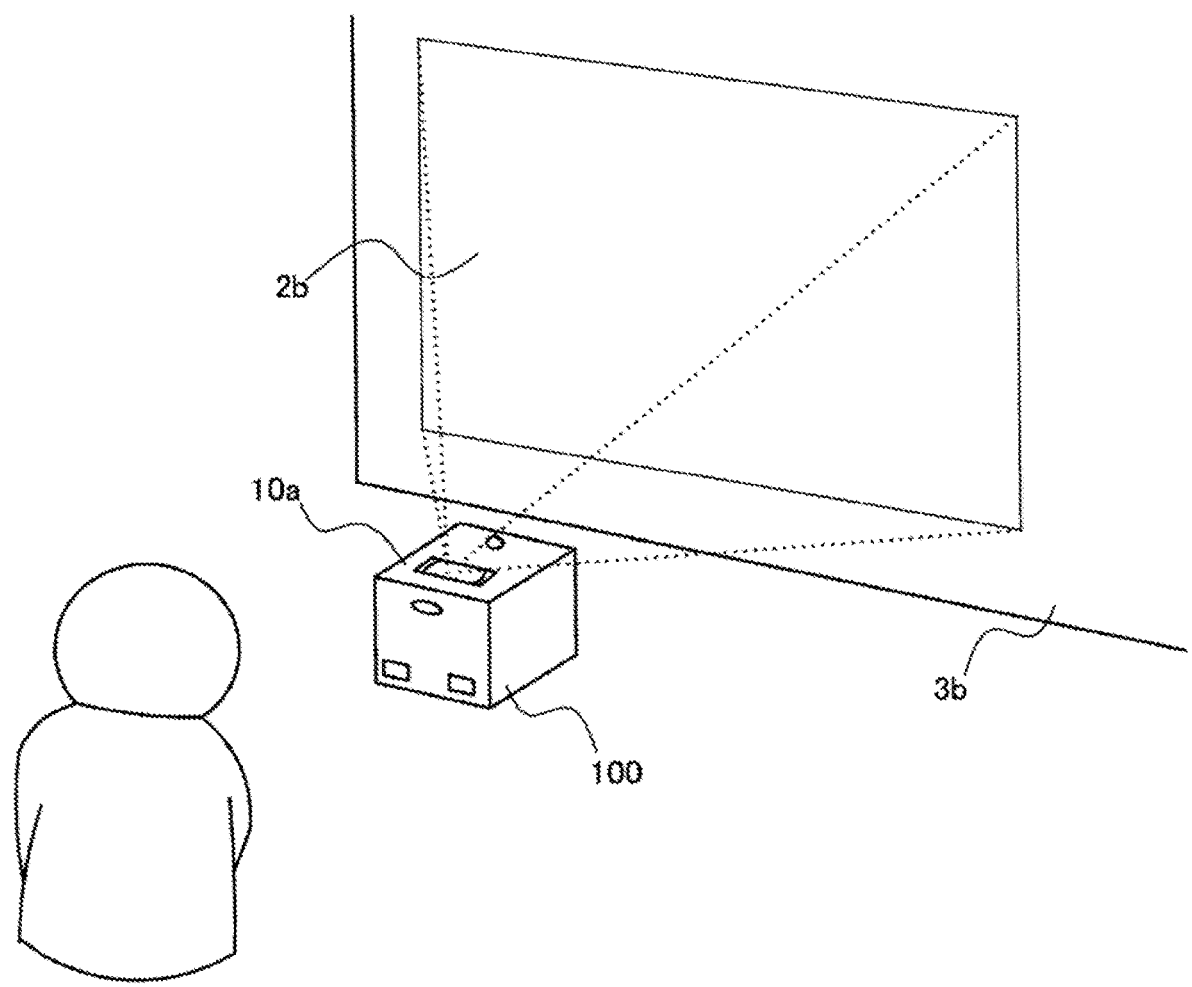
FIG. 2B is an illustrative diagram for describing a second installation attitude of the projection control device.

FIG. 2B is an illustrative diagram for describing a second installation attitude of the projection control device 100. Referring to FIG. 2B, the projection control device 100 is installed on a floor in the second installation attitude. In the second installation attitude, the emission plane 10a of the projection control device 100 serves as the top surface of the projection control device 100. That is, when the floor is a horizontal plane, the emission plane 10a is a horizontal plane as well. In the second installation attitude, the projection control device 100 can project a projection image 2b on a wall surface 3b. In the example of FIG. 2B, a user is positioned on the opposite side of the projection control device 100 to the wall surface 3b, and thus can view the projection image 2b formed on the wall surface 3b.

When the first installation attitude of FIG. 2A is compared to the second installation attitude of FIG. 2B, whereas it is easy for a user to touch the table surface 3a serving as a projection plane in the first installation attitude, it is not that easy for a user to touch the wall surface 3b serving as a projection plane in the second installation attitude. As another installation attitude, if the projection control device 100 in the first installation attitude is installed upside down, the projection control device 100 can project a projection image on a ceiling surface. It is not that easy in this case for a user to touch the ceiling surface serving as a projection plane either.

While there are such cases in which a touch input to a projection plane is suitable for a user interface (UI) depending on a positional relationship of a projector with respect to the projection plane as described above, there are cases in which such a touch input is not suitable for a UI. Thus, the technology of the present disclosure adopts a mechanism for adaptively changing the scheme of a user interface on which projection images are utilized depending on a place on which images are to be projected, as will be described in detail in the present specification.

[1-3. Mechanism of Touch Input Detection System]

Now, an example of a touch detection scheme for detecting touch inputs onto a projection plane will be described. Note that the scheme described here is merely an example, and another touch detection scheme may be used.

(1) Overview of Touch Input Detection Scheme

Figure 3:
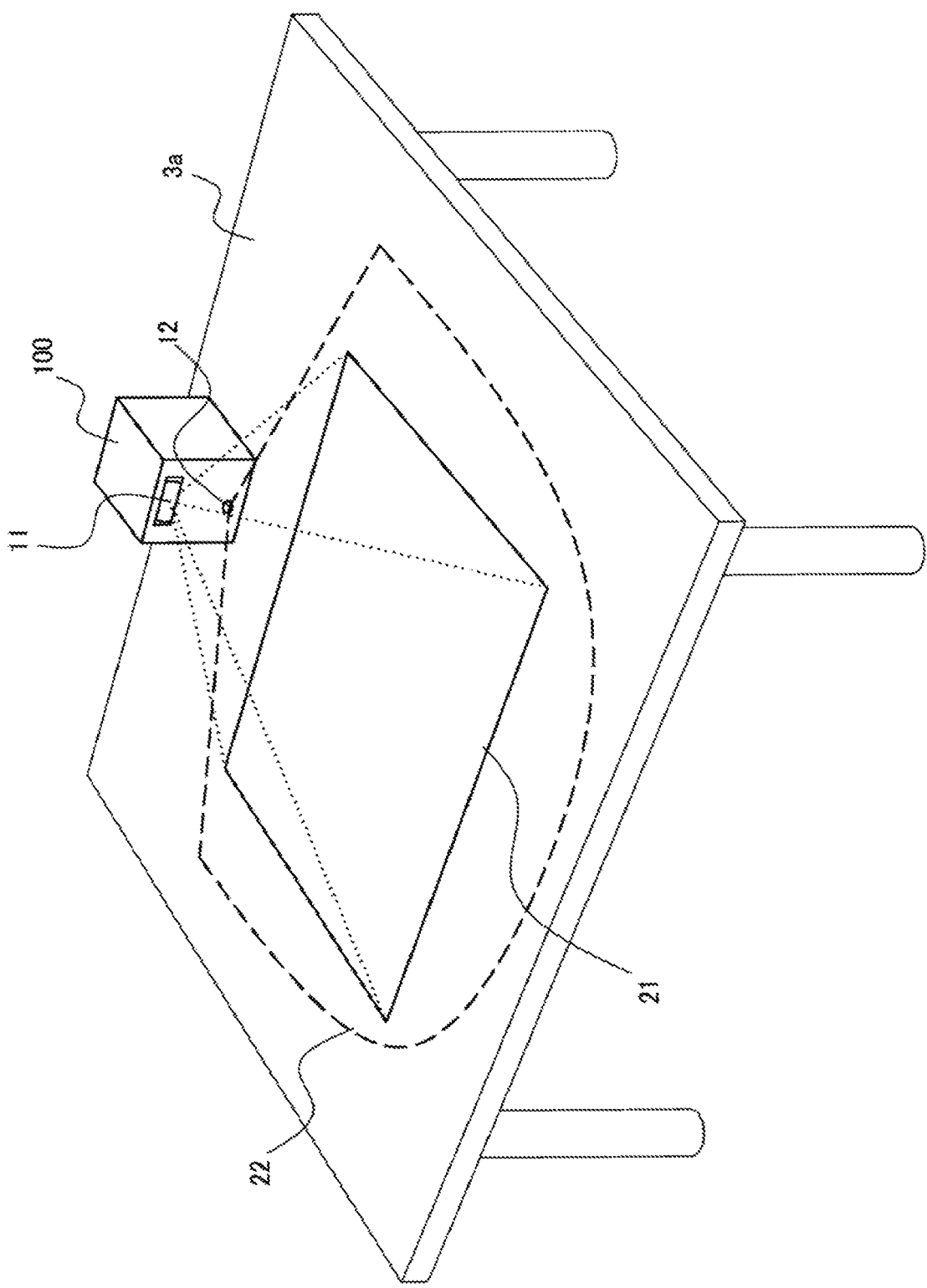
FIG. 3 is an illustrative diagram for describing an overview of a touch input detection scheme that can be employed in a first user input detection system.

FIG. 3 is an illustrative diagram for describing an overview of a touch input detection scheme that can be employed in the first user input detection system 17. In FIG. 3, the projection control device 100 is placed on the table surface 3a in the first installation attitude, as in the example of FIG. 2A. The projection control device 100 emits projection light through the projection light opening 11 to project a projection image 21 on the table surface 3a. Further, the projection control device 100 emits search light through the search light opening 12 toward a search area in the vicinity of the projector to form a search plane 22. The search light may be non-visible light, for example, infrared light, etc.

The search light opening 12 is provided, for example, slightly above from the bottom of the projection control device 100 in the first installation attitude (for example, a height of the opening from the bottom may be about several mm to several tens of mm). The search plane 22 formed by a trace of the search light may be, for example, substantially parallel to the bottom of the projection control device 100, and in this case, the search plane 22 is a plane that is substantially parallel to the table surface 3a serving as a projection plane, being separated by a slight distance from the table surface. This search plane 22 may be understood as a barrier curtain made of the trace of search light covering the projection image 21. In general, projection planes are flat (however, the technology of the present disclosure can be applied even to the case in which a projection plane is not necessarily flat). If there is no blocking material on or around the projection plane, search light passes over the projection image 21, without being blocked. However, if a user touches the projection image with his or her finger or any other manipulation object, the manipulation object reflects the search light, causing the light to diffuse in all directions. The first user input detection system 17 of the projection control device 100 receives the search light reflected as above through the projection light opening 11, and detects the light with an image sensor arranged at a position optically conjugate with a light valve of the projector. Accordingly, the projection control device 100 can detect the part on the projection image that has been touched (pointed at) with accuracy close to, for example, that of a general resistance film type or capacitance type touch sensor.

(2) Configuration of Detection System

Figure 4:
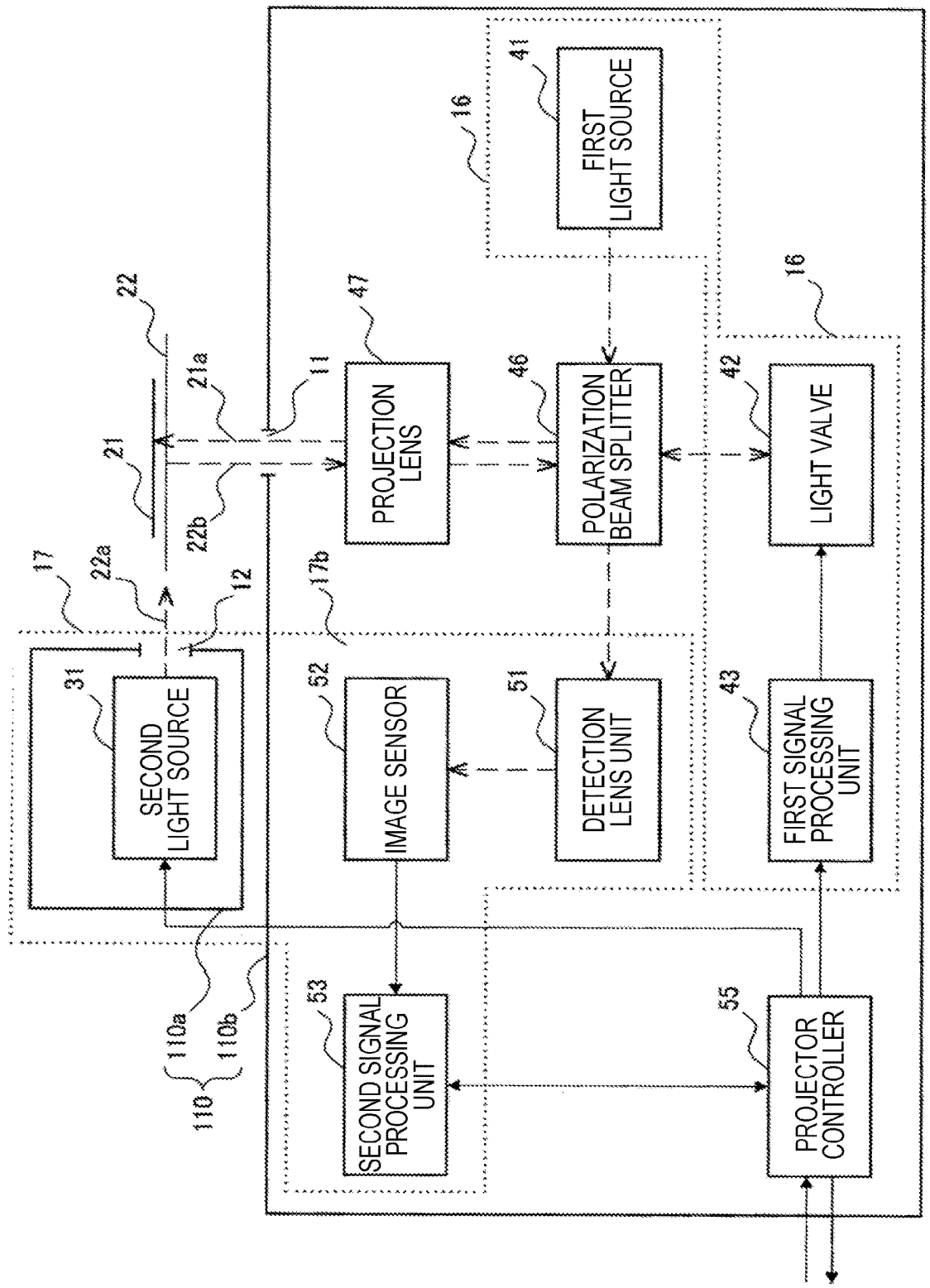
FIG. 4 is a block diagram illustrating an example of a detailed configuration of the first user input detection system.

FIG. 4 is a block diagram illustrating an example of a detailed configuration of the first user input detection system 17. In the example of FIG. 4, the first user input detection system 17 is a part of a projector module 110. The projector module 110 includes an image projection system 16, the first user input detection system 17, a polarization beam splitter 46, a projection lens 47, and a projector controller 55. The image projection system 16 includes a first light source 41, a light valve 42, and a first signal processing unit 43. The first user input detection system 17 includes a second light source 31, a detection lens unit 51, an image sensor 52, and a second signal processing unit 53. While the second light source 31 is arranged inside a projector sub module 110a that is linked with the search light opening 12, the remaining constituent elements of the projector module 110 illustrated in FIG. 4 are arranged inside another projector sub module 110b that is linked with the projection light opening 11.

The first light source 41 is a light source that generates visible light, and radiates the generated visible light to the light valve 42 through the polarization beam splitter 46. Visible light generated by the first light source 41 may be, for example, laser light including three color components of red, green, and blue. The light valve 42 may be, for example, a reflection type liquid crystal device of liquid crystal on silicon (LCOS), or the like. The light valve 42 modulates, for example, a first polarized component (for example, an s-polarized component Ls1 to be described below) of visible light incident from the first light source 41 based on an image signal input from the first signal processing unit 43, and rotates it to a second polarized component (for example, a p-polarized component Lp2 to be described below). Then, visible light having the second polarized component (modulated light) is emitted toward the projection lens 47 via the polarization beam splitter 46. Note that the light valve 42 can also express black by reflecting the first polarized component of incident visible light in its polarization state without change.

The projection lens 47 projects modulated light 21a incident from the light valve 42 via the polarization beam splitter 46 toward the projection plane through the projection light opening 11, and thereby forming the projection image 21 on the projection plane. Further, the projection lens 47 receives search light 22b (which has been reflected by any manipulation object) which is incident through the projection light opening 11 from the opposite direction to the traveling direction of the modulated light 21a. The search light 22b is further incident on the polarization beam splitter 46 via the projection lens 47.

The polarization beam splitter 46 splits the incident search light into a first polarized component (for example, an s-polarized component) and a second polarized component (for example, p-polarized component), and directs the components in different directions. For example, the first polarized component of the search light is selectively reflected on the polarization beam splitter 46, which then causes the light to be incident onto the detection lens unit 51. On the other hand, the second polarized component of the search light selectively penetrates the polarization beam splitter 46, which then causes the light to be incident onto the light valve 42. Note that a polarization splitting element of another type such as a wire grid may be used instead of the polarization beam splitter 46.

Figure 5:
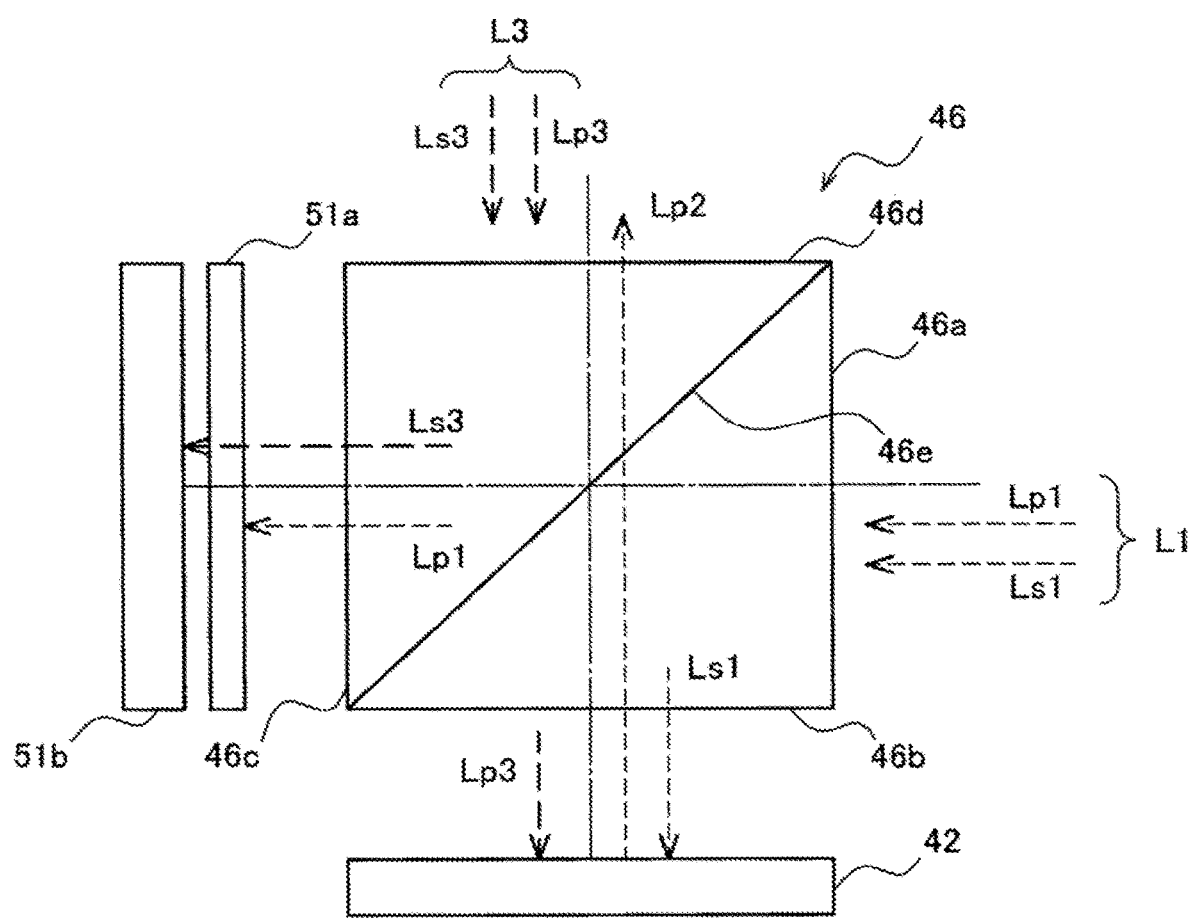
FIG. 5 is an illustrative diagram for describing an effect of a polarization beam splitter illustrated in FIG. 4.

An effect of the polarization beam splitter illustrated in FIG. 4 will be further described using FIG. 5. The polarization beam splitter 46 has a first optical plane 46a, a second optical plane 46b, a third optical plane 46c, a fourth optical plane 46d, and a polarization splitting plane 46e. The first optical plane 46a and the third optical plane 46c are disposed to face each other back-to-back in the horizontal direction in the drawing, and the second optical plane 46b and the fourth optical plane 46d are disposed to face each other back-to-back in the vertical direction in the drawing. The first optical plane 46a faces the first light source 41 (which is not illustrated in FIG. 5). The second optical plane 46b faces the light valve 42. The third optical plane 46c faces the detection lens unit 51. The fourth optical plane 46d faces the projection lens 47 (which is not illustrated in FIG. 5).

Visible light L1 radiated from the first light source 41 is incident on the first optical plane 46a, and the first polarized component (the s-polarized light component Ls1) of the visible light L1 is reflected on the polarization splitting plane 46e and then emitted from the second optical plane 46b. A second polarized component (the p-polarized component Lp1) of the visible light L1 passes through the polarization splitting plane 46e, and then is emitted from the third optical plane 46c. Modulated light Lp2 from the light valve 42 is incident on the second optical plane 46b, and a second polarized component (a p-polarized component Lp2) of the modulated light Lp2 is emitted from the fourth optical plane 46d.

On the other hand, search light L3 is incident on the fourth optical plane 46d, and a first polarized component (an s-polarized component Ls3) of the search light L3 is reflected on the polarization splitting plane 46e, and then emitted from the third optical plane 46c. A second polarized component (a p-polarized component Lp3) of the search light L3 passes through the polarization splitting plane 46e, and then is emitted from the second optical plane 46b. The first polarized component Ls3 of the search light L3 passes through relay lenses 51a and 51b of the detection lens unit 51, and a visible light cut filter and a band-pass filter that are not illustrated, and then reaches the image sensor 52. The band-pass filter allows light of a specific wavelength range (including the wavelength of the search light) to selectively pass therethrough.

Referring to FIG. 4 again, the second light source 31 is a light source that generates search light 22a for searching for a manipulation object that is used for a touch input and radiates the generated search light toward a search region in the vicinity of the projector. As described above, the search light 22a may be non-visible light such as infrared light (for example, near-infrared light). The search light 22a from the second light source 31 is radially emitted, for example, through the search light opening 12 to form the search plane 22 that is substantially parallel with the bottom of the projection control device 100 of the example of FIG. 3. Then, the first polarized component of the search light 22b reflected by the manipulation object touching the projection image 21 is further reflected on the polarization beam splitter 46 as described above and then reaches the detection lens unit 51.

The detection lens unit 51 includes one or more relay lenses that cause an image of the search light 22b to be formed at a position optically conjugate with the light valve 42. For the purpose of miniaturizing the image sensor 52, the detection lens unit 51 may reduce the image of the search light 22b by reducing the image of the search light 22b in a uniform manner. The image sensor 52 captures the image of the search light 22b formed at the position optically conjugate with the light valve 42, and generates a search image signal. The image sensor 52 may be an image sensor of any type, for example, a complementary metal-oxide semiconductor (CMOS), a charge coupled device (CCD), or the like.

The second signal processing unit 53 executes predetermined signal processing such as development or noise removal on the search image signal output from the image sensor 52. Then, the second signal processing unit 53 outputs the processed search image signal to the projector controller 55.

The first signal processing unit 43 causes a driver circuit of the light valve 42 to supply a voltage to each pixel of the light valve 42 according to a projection image signal input via the projector controller 55. As a result, the above-described visible light (projection light) is modulated, and thus the projection image 21 is produced on the projection plane.

The projector controller 55 outputs the projection image signal supplied from outside of the projector module 110 to the first signal processing unit 43 to cause the projection image 21 to be projected on the projection plane through the image projection system 16. The projector controller 55 may execute general projection control functions such as auto-focusing and trapezoidal correction. Furthermore, in the present embodiment, the projector controller 55 detects a touch input on the projection image based on a search image expressed with a search image signal input from the first user input detection system 17.

Figure 6:
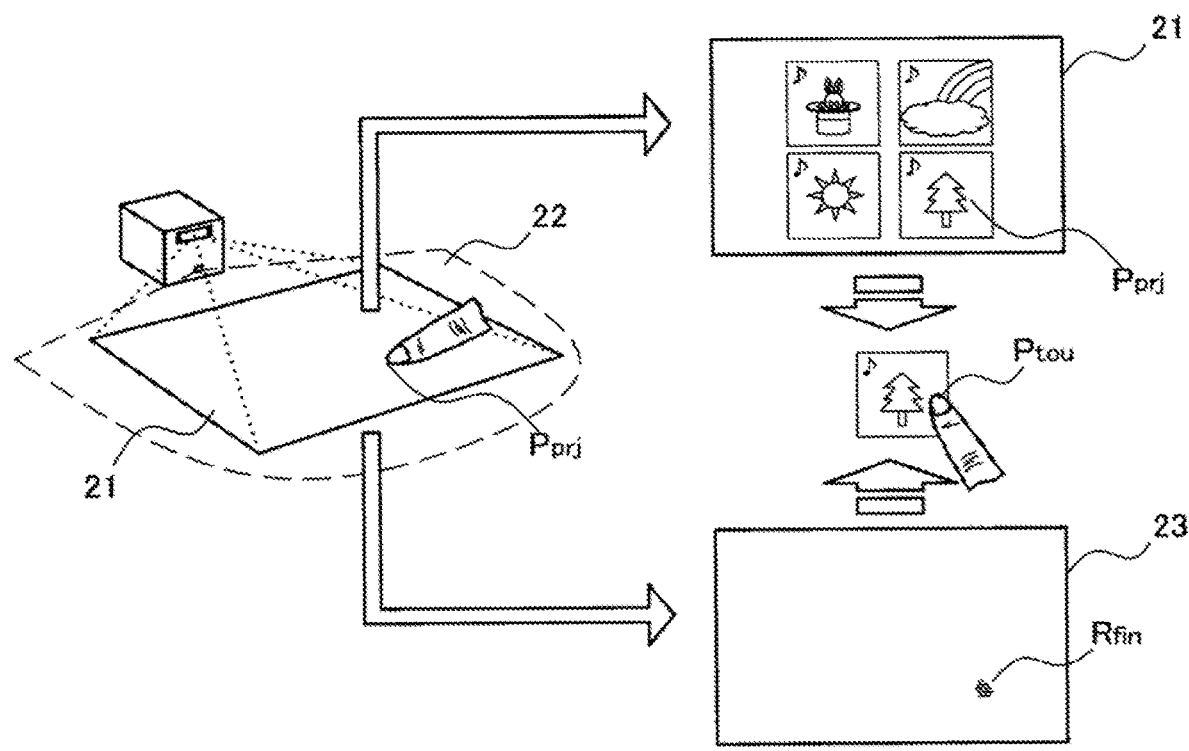
FIG. 6 is an illustrative diagram for describing detection of a touch position using a search image.

FIG. 6 is an illustrative diagram for describing detection of a touch position using a search image. Also in the example of FIG. 6, the search plane 22 is formed to cover the projection image 21. A user touches a position $P_{prj}$ on the projection image 21 with, for example, his or her finger. Search light reflected on the finger touching the position $P_{prj}$ is captured by the image sensor 52, and forms a manipulation object image $R_{fin}$ within a search image 23. The projector controller 55, for example, executes a known feature point detection method on the manipulation object image $R_{fin}$ to detect a touch position $P_{tou}$ within the search image 23. A feature point position (i.e., the touch position) may be, for example, the position of the tip of the finger, the barycentric position of the manipulation object image $R_{fin}$, or the like. As described above, since the search image is imaged by the image sensor 52 disposed substantially at the position optically conjugate with the light valve 42, the coordinates of the touch position $P_{tou}$ on the search image 23 match the coordinates of a touch position $P_{prj}$ on the projection image 21.

A touch input onto the projection plane can be detected with high detection accuracy using the first user input detection system 17 as described above. Particularly, because the manipulation object generally reflects search light only in the vicinity of the projection plane in the first installation attitude illustrated in FIG. 2A, a level of touch input detection accuracy close to that of a normal-type touch sensor can be achieved. On the other hand, in the second installation attitude illustrated in FIG. 2B, a search plane is not necessarily in the vicinity of the projection plane, and even if a user touches the projection plane, detecting its touch position with the accuracy similar to the case of the first installation attitude is not easy. Detection of a touch may be obstructed as a result of an obstacle other than a manipulation object (for example, a part of the body of a user) being interposed between the projection plane and the projector. Taking this circumstance into account in the embodiment to be described in detail in the next section, a positional relationship of the projector with respect to the projection plane is dynamically determined, and a mode of a user interface is switched between two or more UI modes based on the result of the determination.

<2. Configuration of Device>

[2-1. Overall Configuration]

FIG. 7 is a block diagram illustrating an example of a configuration of the projection control device 100 according to an embodiment. Referring to FIG. 7, the projection control device 100 is provided with the projector module 110, a recognition module 120, a sensor module 130, a software module 140, a communication interface 150, and an integrated control unit 160, in addition to the camera 13, the microphone 14, and the speaker 15 illustrated in FIG. 1. The projector module 110 has the image projection system 16 and the first user input detection system 17 described above. The camera 13, the microphone 14, and the speaker 15 constitute the second user input detection system 18, together with the recognition module 120.

(1) Projector Module

The projector module 110 is a module that performs projection of images on the projection plane and control of the projection. An example of a detailed configuration of the projector module 110 is as described using FIGS. 4 and 5. The projector module 110 projects an image generated by the software module 140 to be described below toward the projection plane through the image projection system 16, for example, under control of the integrated control unit 160. The projected image may be a still image, or each of frames constituting a dynamic image.

The first user input detection system 17 of the projector module 110 can detect a position of a touch of a user using search light emitted toward a search area in the vicinity of the projection control device 100 as described above. The search area forms a search plane that is substantially parallel with an installation plane when the projection control device 100 is installed in the above-described first installation attitude. On the other hand, when the projection control device 100 is installed in the above-described second installation attitude, the search area forms a search plane that is substantially orthogonal to the installation plane. When the projection plane is substantially parallel with the search plane and the distance between the projection plane and the search plane is short, the first user input detection system 17 can achieve a sufficient level of touch detection accuracy. The "projection plane being substantially parallel with the search plane" includes a touch detection error caused by an angle formed by these planes falling within a tolerable range (of, for example, touch input adaptive software to be described below), in addition to the fact that these planes are exactly parallel with each other. When a touch input is detected, the first user input detection system 17 notifies the integrated control unit 160 of the occurrence of a touch event. Touch event information can include a type of event such as touching, tapping, double tapping, flicking, pinch-in, or pinch-out, and one or more sets of touch position coordinates associated with the event. In a certain UI mode, the first user input detection system 17 can be used as a primary input interface. In another UI mode, the first user input detection system 17 may be used as an auxiliary input interface or may be disabled.

(2) Recognition Module

The recognition module 120 is a module that executes a recognition process for detecting a user input in the second user input detection system 18. The recognition module 120 may detect a user input based on, for example, an image input from the camera 13. The camera 13 is typically arranged in the projection control device 100 such that it has an angle of view in the direction in which a user is assumed to be present in the second installation attitude of the projection control device 100. In the example of FIG. 2B, the camera 13 is arranged on a surface of the projection control device 100 on the opposite side to the projection plane. In another example, the camera 13 may be arranged on a side surface at a right angle to the projection plane. In addition, the camera 13 may be a full-dome camera or a half-dome camera. The recognition module 120 may detect a gesture input as a user input by, for example, recognizing a gesture of a user appearing in a captured image input from the camera 13. In addition, the recognition module 120 may detect a line-of-sight input as a user input by recognizing a motion of the eyes of a user appearing in a captured image input from the camera 13. When a user input is detected based on such an image input, even if a point on a projection image can be virtually touched (or pointed at) through the user input, touch detection accuracy (pointing accuracy) of that case is lower than that of the first user input detection system 17. Touch detection (pointing at a desired point) may not be possible depending on a situation.

Additionally or alternatively, the recognition module 120 may detect a user input based on, for example, a sound input from the microphone 14. The recognition module 120 can detect a voice command as a user input by recognizing, for example, a predetermined sound pattern included in sounds collected by the microphone 14. When a user input is detected based on such a sound input, pointing at a desired point on the projection plane is not possible.

When a gesture input, a line-of-sight input, or a user input that can be equivalent to a voice command is detected, the recognition module 120 notifies the integrated control unit 160 of the occurrence of a user input event. Note that a type of user input that can be detected by the second user input detection system 18 is not limited to the examples described above. For example, the second user input detection system 18 may detect a user input via a mechanical interface such as a button, a switch, or a lever arranged on the device, or may detect a user input through vibration of the device, recognition of respiration of a user, or the like.

(3) Sensor Module

The sensor module 130 includes one or more sensors to be used for determining a positional relationship of the projection control device 100 with respect to the projection plane. As an example, the sensor module 130 can include an attitude sensor 131 that measures attitudes of the projection control device 100. The attitude sensor 131 may be, for example, an acceleration sensor or a gyro sensor. The attitude sensor 131 measures a tilting angle of the projection control device 100 at a corresponding time with respect to a reference attitude of the projection control device 100, and outputs the measurement result to the integrated control unit 160.

As another example, the sensor module 130 can include a depth sensor 133 that measures a distance from the projection control device 100 to the projection plane (which will be referred to hereinafter as a depth of the projection plane), instead of or in addition to the attitude sensor 131. The depth sensor 133 may be a depth sensor of any type, for example, a stereo camera type, a time-of-flight (TOF) type, or the like. The depth sensor 133 typically measures a depth of the projection plane using a position of the projection control device 100 as a reference, and outputs the measurement result to the integrated control unit 160.

(4) Software Module

The software module 140 has a processor such as a central processing unit (CPU) and a memory that can include a read only memory (ROM) and a random access memory (RAM), and executes software that generates images to be projected. As an example, the software module 140 selectively executes touch input adaptive software 141 and touch input non-adaptive software 143 under control of the integrated control unit 160. The touch input adaptive software 141 may include touch input adaptive basic software (an operating system for mobile devices, (for example, Android (registered trademark), iOS, or Windows Mobile (registered trademark)). In addition, the touch input adaptive software 141 may include touch input adaptive application software. The touch input adaptive application software may include various kinds of software, for example, a web browser, mailer software, a text editor, an instant messenger, and the like which are designed to operate on mobile devices such as smartphones or tablet personal computers (PCs).

The touch input non-adaptive software 143 may be any type of software that does not require precise pointing for operations. The touch input non-adaptive software 143 may also include any combination of basic software and application software. A few examples of the touch input non-adaptive software 143 will be further described below.

(5) Communication Interface

The communication interface 150 mediates communication between the projection control device 100 and another device. The communication interface 150 may implement a cellular communication protocol such as WiMAX, Long Term Evolution (LTE), or LTE-Advanced (LTE-A), or another wireless communication protocol such as wireless LAN (which is also called Wi-Fi (registered trademark)) or Bluetooth (registered trademark). In addition, the communication interface 150 may implement a wired communication protocol such as Universal Serial Bus (USB) or High-Definition Multimedia Interface (HDMI). The projector module 110 may project an image received from another device via the communication interface 150 on the projection plane, instead of an image generated in the software module 140.

(6) Integrated Control Unit

The integrated control unit 160 has a processor such as a CPU and a memory that can include a ROM and a RAM, and controls overall operations of the projection control device 100. When the projection control device 100 is activated, for example, the integrated control unit 160 causes the software module 140 to execute any piece of software. In addition, the integrated control unit 160 causes the projector module 110 to project an image (for example, an image of the operating system or an image of an application) generated by the software being executed on the projection plane. Further, when any user input event is notified by the first user input detection system 17 or the second user input detection system 18, the integrated control unit 160 hands over this user input event to the software being executed. When the notified user input event indicates a specific user input, the integrated control unit 160 may process the user input event by itself (for example, turning power of the projection control device 100 off according to a voice command instructing stop of an operation, etc.), instead of handing over the user input event to the software.

In the present embodiment, the integrated control unit 160 determines a positional relationship of the projection control device 100 with respect to the projection plane, and switches a mode of a user interface (UI) for projecting images between two or more UI modes based on the result of the determination. A first UI mode is one in which the first user input detection system 17 is used as a primary input interface. A second UI mode is one in which the first user input detection system 17 is not used as a primary input interface. In description below, the first UI mode will be referred to as a "touch mode" and the second UI mode will be referred to as a "non-touch mode."

The integrated control unit 160 may cause the software module 140 to execute different pieces of software depending on which of the touch mode and the non-touch mode has been selected. For example, when the touch mode is selected, the integrated control unit 160 can cause the software module 140 to execute the touch input adaptive software 141. In addition, when the non-touch mode is selected, the integrated control unit 160 can cause the software module 140 to execute the touch input non-adaptive software 143.

[2-2. Switch of UI Mode]

The integrated control unit 160 selects the touch mode when the first user input detection system 17 is determined to be capable of achieving a certain level of touch detection accuracy typically based on a positional relationship of the projection control device 100 with respect to the projection plane. For example, when the projection control device 100 is placed on a table surface in the first installation attitude and an image is projected on the table surface as illustrated in FIG. 2A, a search plane is formed in the vicinity of the projection image to cover the projection image, and thus the first user input detection system 17 can achieve a sufficient level of touch detection accuracy for the touch input adaptive software 141. Thus, in this case, the integrated control unit 160 can select the touch mode. This selection may be made based on simple determination of whether the projection plane is positioned substantially horizontally below the projection control device 100 using the attitude sensor 131 or the depth sensor 133. On the other hand, when the projection control device 100 is installed in the second installation attitude as illustrated in FIG. 2B, the search plane and the projection plane of the projection control device 100 have a certain degree of distance therebetween, and thus it can be inferred that the first user input detection system 17 is likely not to achieve a sufficient level of touch detection accuracy. Thus, the integrated control unit 160 can select the non-touch mode in this case.

Figure 8A:
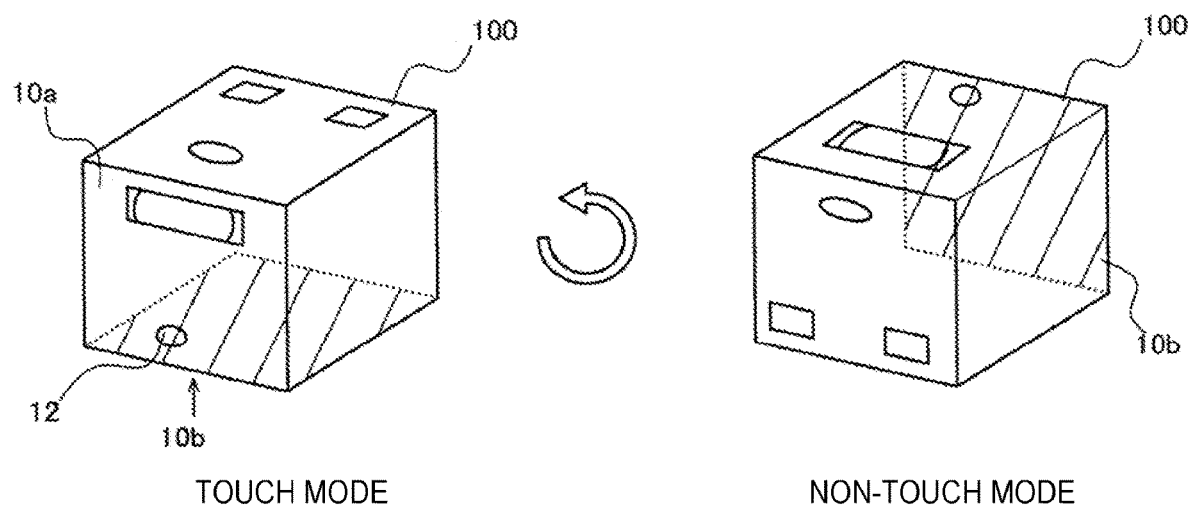
FIG. 8A shows illustrative diagrams for describing a first example of switching of UI modes based on positional relationships of a projector with respect to a projection plane.

As a first example of determination of a positional relationship, when a result of measurement of an attitude of the projection control device 100 input from the attitude sensor 131 indicates that the search plane is substantially horizontal, the integrated control unit 160 may infer that the projection control device 100 is installed above the projection plane in the above-described first installation attitude. FIG. 8A shows illustrative diagrams for describing a first example of switching of UI modes based on positional relationships of the projector with respect to a projection plane. Here, among surfaces of the housing of the projection control device 100 orthogonal to the emission plane 10a described using FIG. 1, a surface 10b that is closest to the search light opening 12 (on a lower side thereof in the drawing) is assumed to be a reference plane for measurement of an attitude. The reference plane 10b is substantially horizontal to the search plane. The measurement result input from the attitude sensor 131 indicates that the reference plane 10b is horizontal and a normal line of the reference plane 10b is oriented in the direction of gravity. This measurement result can mean that the projection control device 100 is installed on a horizontal surface such as a table surface in the first installation attitude. Thus, the integrated control unit 160 can select the touch mode based on the measurement result. On the other hand, a measurement result input from the attitude sensor 131 may indicate that the reference plane 10b is vertical with respect to the horizontal surface on the right of FIG. 8A. This measurement result can mean that the projection control device 100 is not installed in the first installation attitude. Thus, the integrated control unit 160 can select the non-touch mode based on the measurement result. Table 1 indicates a framework of selection of UI modes based on the above-described attitudes of the projector.

TABLE 1

Selection of UI modes based on attitudes of projector

| Attitudes of (reference plane of) projector | Horizontal | Vertical |
|---|---|---|
| UI mode to be selected | Touch mode | Non-touch mode |

Figure 8B:
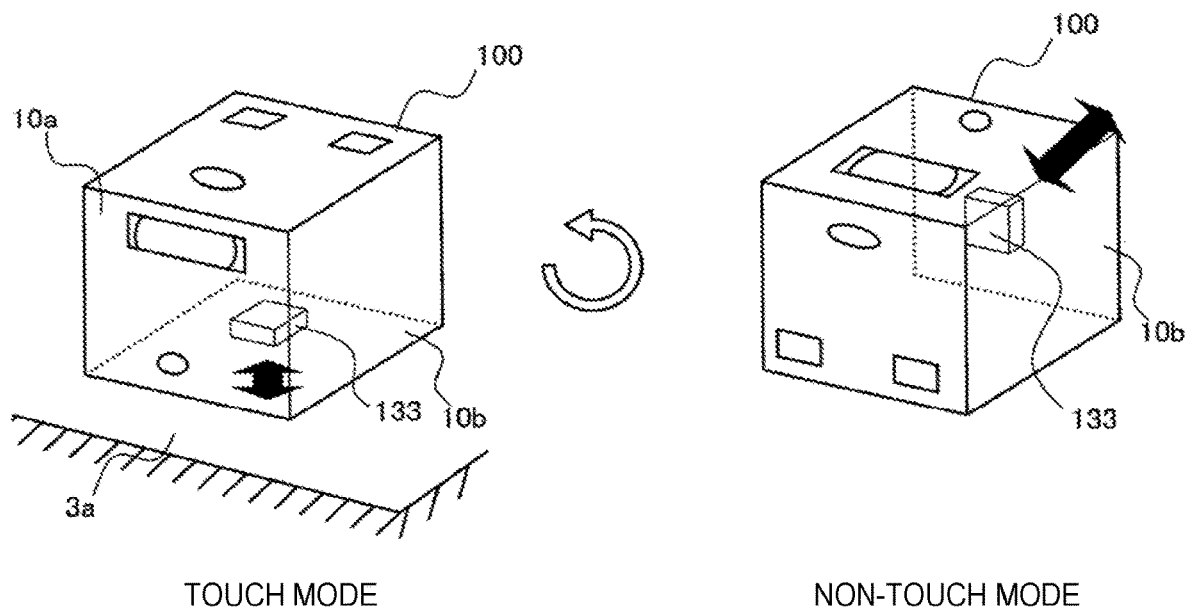
FIG. 8B shows illustrative diagrams for describing a second example of switching of UI modes based on positional relationships of a projector with respect to a projection plane.

As a second example of determination of a positional relationship, when a result of measurement indicating a depth of the projection plane input from the depth sensor 133 indicates that a distance between the search plane and the projection plane is short, the integrated control unit 160 may simply determine that the projection control device 100 is installed above the projection plane in the above-described first installation attitude. FIG. 8B shows illustrative diagrams for describing a second example of switching of the UI modes based on positional relationships of the projector with respect to a projection plane. Here, the depth sensor 133 measures a depth of the reference plane 10b in the normal line direction. In the left drawing of FIG. 8B, a measurement result input from the depth sensor 133 indicates a depth that is smaller than a certain threshold value, which means that an installation plane such as a table surface is present beneath the reference plane 10b. Thus, the integrated control unit 160 can select the touch mode based on the measurement result. On the other hand, in the right drawing of FIG. 8B, a measurement result input from the depth sensor 133 indicates a depth that is greater than the certain threshold value because the reference plane 10b is not in contact with any object. Thus, the integrated control unit 160 can select the non-touch mode based on the measurement result. Table 2 shows a framework of such selection of the UI modes based on depths of the projection plane.

TABLE 2

Selection of UI modes based on depths of projection plane

| Depths of projection plane from projector | Smaller than threshold value | Greater than threshold value |
|---|---|---|
| UI mode to be selected | Touch mode | Non-touch mode |

Note that, according to the above-described second example, when another object comes in contact with the reference plane 10b by accident in, for example, the situation illustrated in FIG. 8B, a measurement result of the depth sensor 133 indicates a depth smaller than the threshold value, and there is a possibility of the integrated control unit 160 erroneously selecting a touch mode. However, when an unintended UI mode is selected, a user can cause the projection control device 100 to select a UI mode again simply by moving an obstructing object. Thus, a possibility of erroneous selection does not diminish usefulness of the above-described technique.

As a third example, the integrated control unit 160 may determine a positional relationship of the projection control device 100 with respect to the projection plane based on a first measurement result from the attitude sensor 131 and a second measurement result from the depth sensor 133. FIG. 9 shows illustrative diagrams for describing a third example of switching of the UI modes based on positional relationships of the projector with respect to a projection plane. In the left drawing of FIG. 9, a first measurement result input from the attitude sensor 131 indicates that the reference plane 10b is horizontal and the normal line of the reference plane 10b is oriented in the direction of gravity. Thus, the integrated control unit 160 can select a touch mode based on this measurement result. In the upper-right drawing of FIG. 9, a measurement result input from the attitude sensor 131 indicates that the reference plane 10b is vertical with respect to the horizontal plane. Thus, the integrated control unit 160 further acquires a second measurement result indicating a depth of the projection plane from the depth sensor 133. In addition, since the acquired second measurement result indicates a depth smaller than a certain threshold value, the integrated control unit 160 can determine that the search plane of the projection control device 100 is in a vicinity close to the projection plane and the first user input detection system 17 can achieve a sufficient level of touch detection accuracy. Thus, the integrated control unit 160 can select the touch mode in this case. On the other hand, when the second measurement result acquired from the depth sensor 133 indicates a depth greater than the threshold value as illustrated in the lower-right drawing of FIG. 9, the integrated control unit 160 can determine that the first user input detection system 17 is not capable of achieving a sufficient level of touch detection accuracy. Thus, the integrated control unit 160 can select the non-touch mode. Table 3 shows a framework of such selection of the UI modes based on an attitude of the projector and a depth of the projection plane.

TABLE 3

Selection of UI modes based on attitude of projector and depth of projection plane

| Depth of projection plane | Attitude of (reference plane of) projector | |
|---|---|---|
| | Horizontal | Vertical |
| Smaller than threshold value | Touch mode | Touch mode |
| Greater than threshold value | | Non-touch mode |

Note that the framework of selection of UI modes shown in Table 3 is merely an example. In another example, when the second measurement result from the depth sensor 133 indicating a depth of the projection plane indicates a depth greater than a certain threshold value, the integrated control unit 160 may select the non-touch mode regardless of an attitude of the reference plane. In addition, when the second measurement result indicates a depth smaller than the threshold value, the integrated control unit 160 may acquire the first measurement result from the attitude sensor 131, and select the touch mode when the first measurement result indicates that the normal line of the reference plane is oriented in the direction of gravity, and select the non-touch mode when it does not. According to such an example, in a situation in which there is a difference in level between a surface on which the projection control device 100 is installed and the projection plane and thus a search plane is not likely to be formed in the vicinity of the projection plane, it is possible to avoid an inappropriate circumstance that the touch mode is selected even though a sufficient level of touch detection accuracy will not be achieved. In addition, there can be an advantage of selecting the non-touch mode rather than the touch mode in a situation in which, when an image is projected on a wall surface even though a depth of the projection plane is small, the size of the shadow of a finger is large and thus operability of a touch input deteriorates. Table 4 shows the framework of such selection of the UI modes different from that of Table 3.

TABLE 4

Selection of UI modes based on attitude of projector and depth of projection plane

| Depth of projection plane | Attitude of (reference plane of) projector | |
|---|---|---|
| | Horizontal | Vertical |
| Smaller than threshold value | Touch mode | Non-touch mode |
| Greater than threshold value | Non-touch mode | |

Although the examples in which a mode is switched between the two UI modes have been described so far, the integrated control unit 160 may switch the mode between three or more UI modes based on positional relationships of the projection control device 100 with respect to the projection plane. For example, there may be three UI modes that are a "table mode" for a case in which a table surface is a projection plane, a "wall mode" for a case in which a wall surface is a projection plane, and a "ceiling mode" for a case in which a ceiling surface is a projection plane. The table mode and the wall mode can correspond to the touch mode and the non-touch mode described above, respectively. The ceiling mode can also correspond to the non-touch mode.

However, while rotation of a projection image based on a user input is enabled in the "ceiling mode," rotation of a projection image can be disabled in the "wall mode." When a measurement result input from the attitude sensor 131 indicates that the reference plane 10b is horizontal but the normal line of the reference plane 10b is oriented in the opposite direction to the direction of gravity, for example, the integrated control unit 160 may select the ceiling mode.

[2-3. Example of User Input]

The integrated control unit 160 uses the first user input detection system 17 as a primary input interface in the touch mode as described above. That is, the integrated control unit 160 enables the first user input detection system 17 in the touch mode. In addition, when the first user input detection system 17 detects a touch input, the integrated control unit 160 hands over a touch event notified by the first user input detection system 17 to software being executed.

Figure 10:
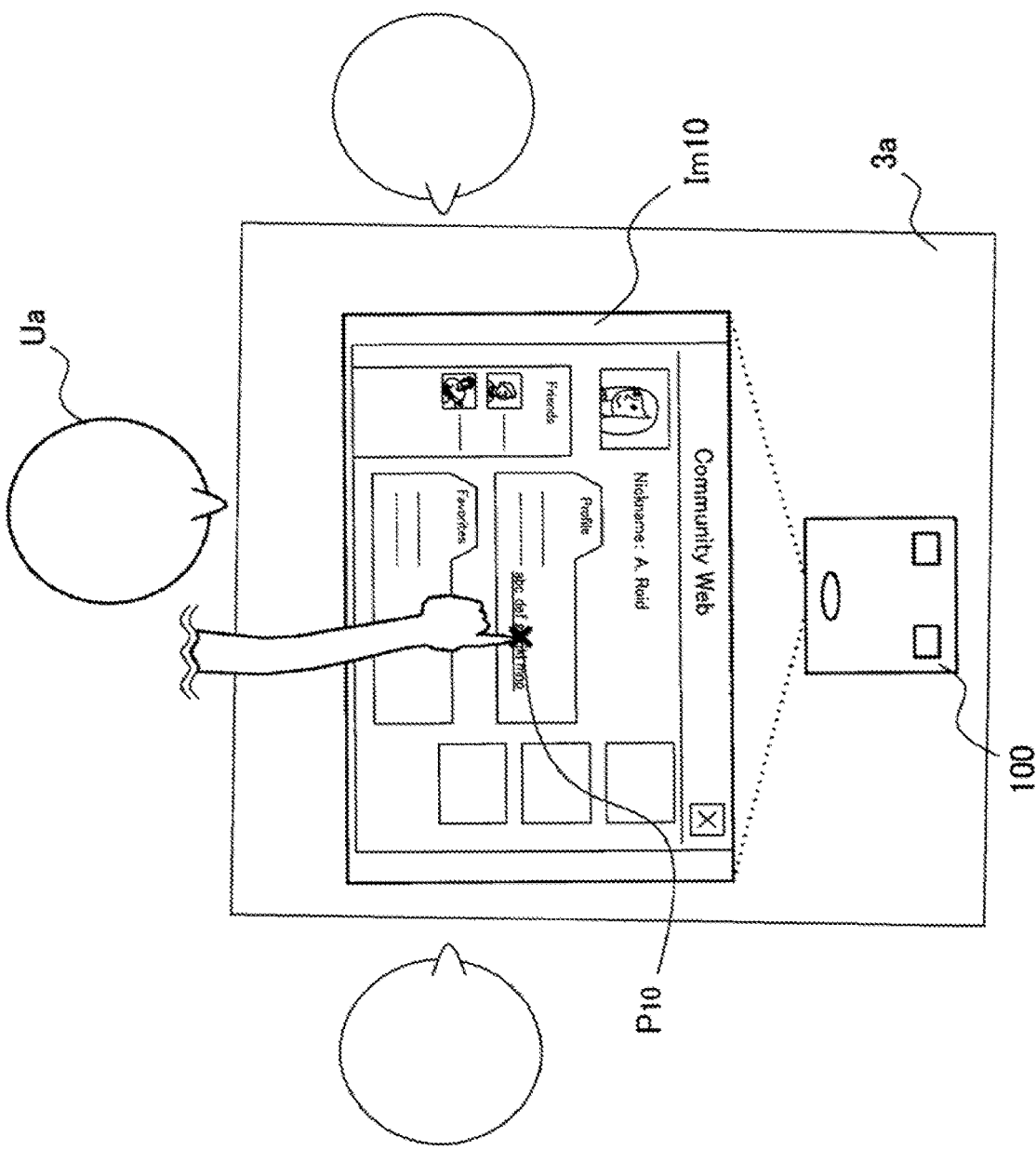
FIG. 10 is an illustrative diagram showing an example of a user input that can be detected by the first user input detection system.

FIG. 10 is an illustrative diagram showing an example of a user input that can be detected by the first user input detection system 17. Referring to FIG. 10, the projection control device 100 is placed on a table surrounded by three users. The projection control device 100 is projecting a projection image Im10 on the table surface 3a. The projection image Im10 is an image of a touch input adaptive web browser that operates on an operating system for mobile devices. A user Ua, for example, taps a position $P_{10}$ on the projection image Im10 to transition a page displayed by the web browser to a web page of a desired link destination. Then, the first user input detection system 17 captures an image of the user Ua who has tapped the position $P_{10}$ using search light, and notifies the integrated control unit 160 of a touch event indicating that the position $P_{10}$ has been tapped. The integrated control unit 160 hands over the notified touch event to the web browser being executed (via the operating system), and as a result, the web page of the desired link destination of the user Ua is displayed by the web browser. Since the first user input detection system 17 achieves a sufficient level of touch detection accuracy in the touch mode, the user can have free interaction with the software being executed via the projection image as if he or she were performing an operation on a touch sensor of a smartphone or a tablet PC.

In the non-touch mode, the integrated control unit 160 selects the second UI mode in which the second user input detection system 18 is used as a primary input interface. Then, when the second user input detection system 18 detects any user input, the integrated control unit 160 hands over a user input event notified by the second user input detection system 18 to software being executed.

Figure 11:
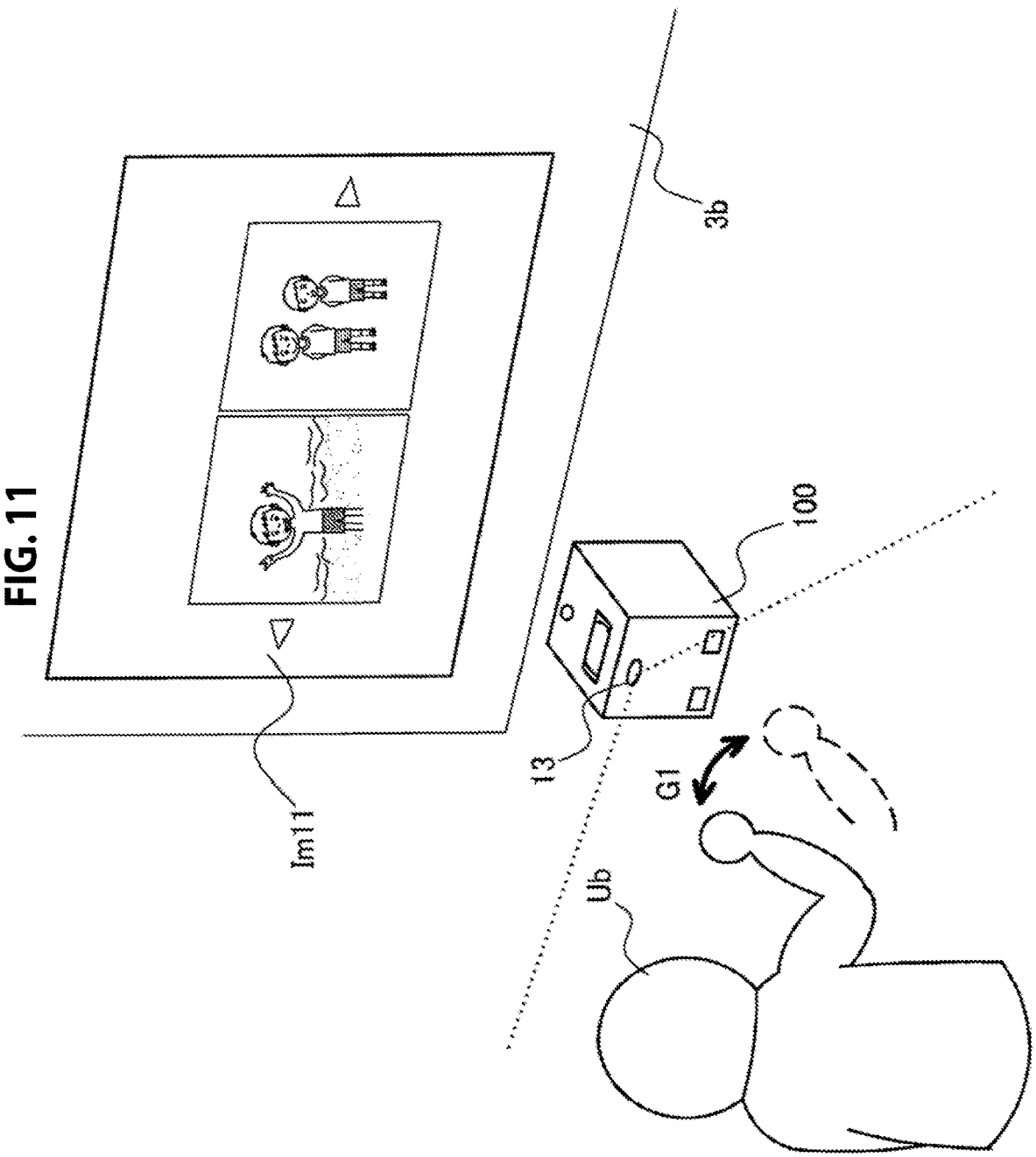
FIG. 11 is an illustrative diagram showing a first example of a user input that can be detected by a second user input detection system.

FIG. 11 is an illustrative diagram showing a first example of a user input that can be detected by the second user input detection system 18. Referring to FIG. 11, the projection control device 100 is installed between the wall surface 3b and a user Ub. The projection control device 100 is projecting a projection image Im11 on the wall surface 3b. The projection image Im11 is an image of a touch input non-adaptive content viewer. The user Ub, for example, makes a gesture G1 of moving his or her hand to the right or left. The gesture G1 may be interpreted as a so-called swipe. Then, the recognition module 120 of the second user input detection system 18 recognizes the gesture G1 appearing in a captured image input from the camera 13, and notifies the integrated control unit 160 of a gesture input event. The integrated control unit 160 hands over the notified gesture input event to the content viewer, and as a result, the display of the content in the projection image is scrolled in the direction corresponding to the input of the gesture.

The recognition module 120 may recognize any type of gesture such as raising a hand, shaking a hand, putting both hands together, or separating both hands, in addition to (or instead of) the above-described swipe. In this gesture interface, the second user input detection system 18 may be capable of detecting a touch (or pointing) based on, for example, a position of a hand and a change in area thereof within a captured image. However, detection accuracy in that case is lower than the level of accuracy achievable by the first user input detection system 17. When a line of sight of a user recognized from a captured image is used as a user input, touching (or pointing) is not possible, or merely low touch detection accuracy can be achieved even if it is possible.

Figure 12:
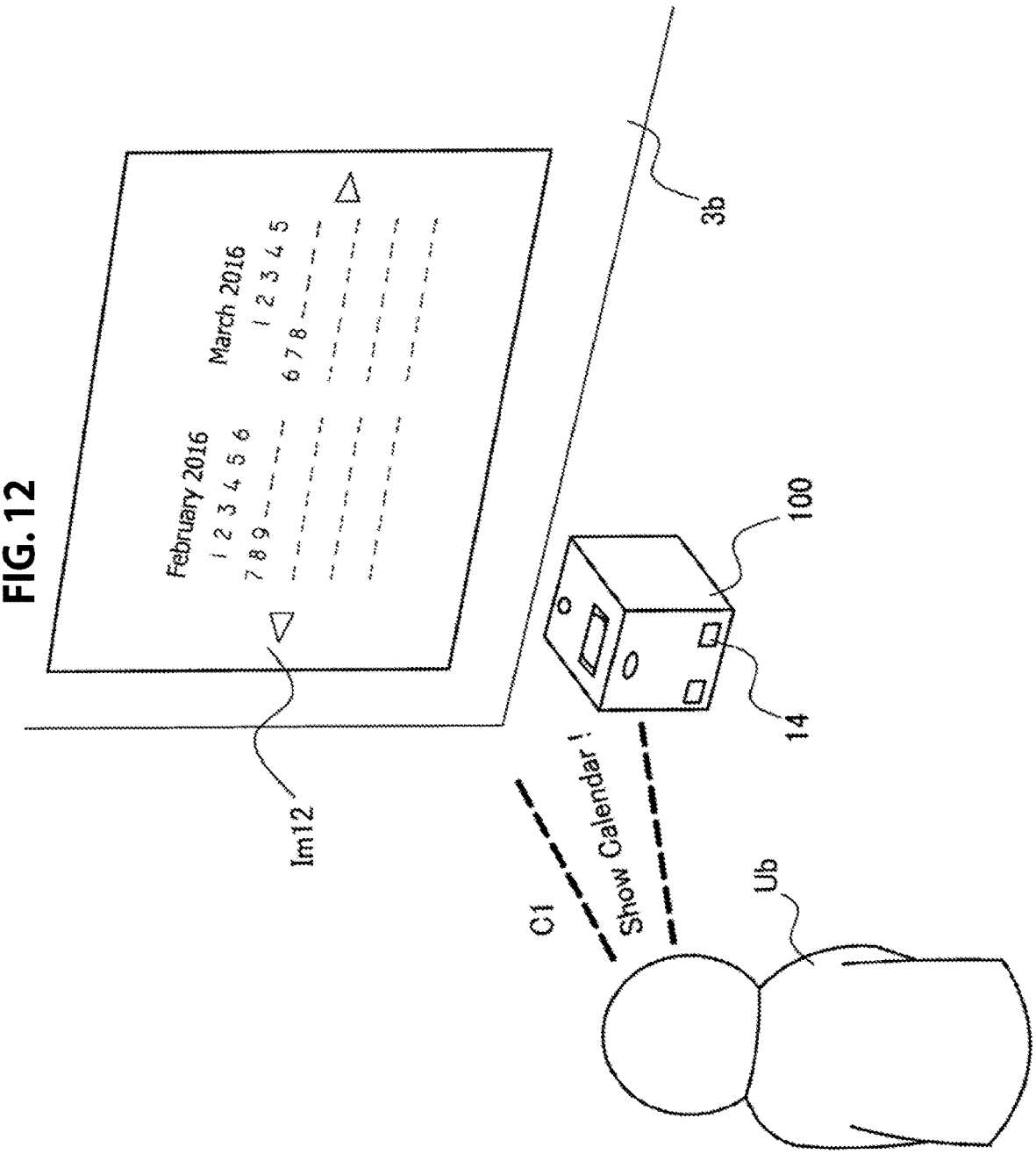
FIG. 12 is an illustrative diagram showing a second example of a user input that can be detected by a second user input detection system.

FIG. 12 is an illustrative diagram showing a second example of a user input that can be detected by the second user input detection system 18. The projection control device 100 is likewise installed between the wall surface 3b and the user Ub in FIG. 12. The user Ub, for example, utters a voice command C1 to call up a calendar. Then, the recognition module 120 of the second user input detection system 18 recognizes the voice command C1 included in a sound input from the microphone 14, and notifies the integrated control unit 160 of a sound input event. The integrated control unit 160 causes the software module 140 to activate a calendar application according to the notified sound input event. As a result, a projection image Im12 displaying a calendar generated by the calendar application is projected on the wall surface 3b. The calendar application is touch input non-adaptive application software, and can be manipulated by a user through, for example, a gesture input or a sound input. The recognition module 120 may recognize any type of voice command. A user interface that uses voice commands is generally incapable of detecting a touch.

Note that the technology is not limited to the examples of FIGS. 11 and 12, and the second user input detection system 18 may include any type of user input mechanism. For example, a human sensor that detects the presence of a human body within a range of several tens of centimeters may be included in the second user input detection system 18 as a user input mechanism that detects a user input expressed with binary values of on and off.

FIGS. 11 and 12 illustrate images of the content viewer and the calendar application as images of the touch input non-adaptive software. However, the touch input non-adaptive software is not limited thereto. For example, touch input non-adaptive software having various purposes such as a clock, a timetable, and for management of household energy may be implemented, and any image of the software may be projected in the non-touch mode.

When the touch mode is selected, the integrated control unit 160 may also use the second user input detection system 18 as an input interface as described with reference to FIGS. 11 and 12, in addition to the first user input detection system 17. On the other hand, when the non-touch mode is selected, the integrated control unit 160 may cause the first user input detection system 17 to be disabled in order to prevent a user from mistakenly performing an unintended touch operation (for example, stopping radiation of search light, or the like). In addition, when the non-touch mode is selected, the integrated control unit 160 may use the first user input detection system 17 as an input interface, in addition to the second user input detection system 18. In the non-touch mode, precise pointing through a touch input can be difficult due to the degree of the distance between the projection plane and the search plane. However, the first user input detection system 17 can still be used as a simple user input mechanism for detecting whether a hand is blocking search light (expressed with, for example, binary values of on and off).

The integrated control unit 160 may enable a user interface for rotating a projection image (which will be referred to hereinafter as a rotation UI) when the projection plane is determined to be substantially horizontal, and may cause the rotation UI to be disabled when the projection plane is substantially vertical. The rotation UI can include one or more of a graphical user interface (GUI) displayed together with a projection image and a sound UI.

Figure 13:
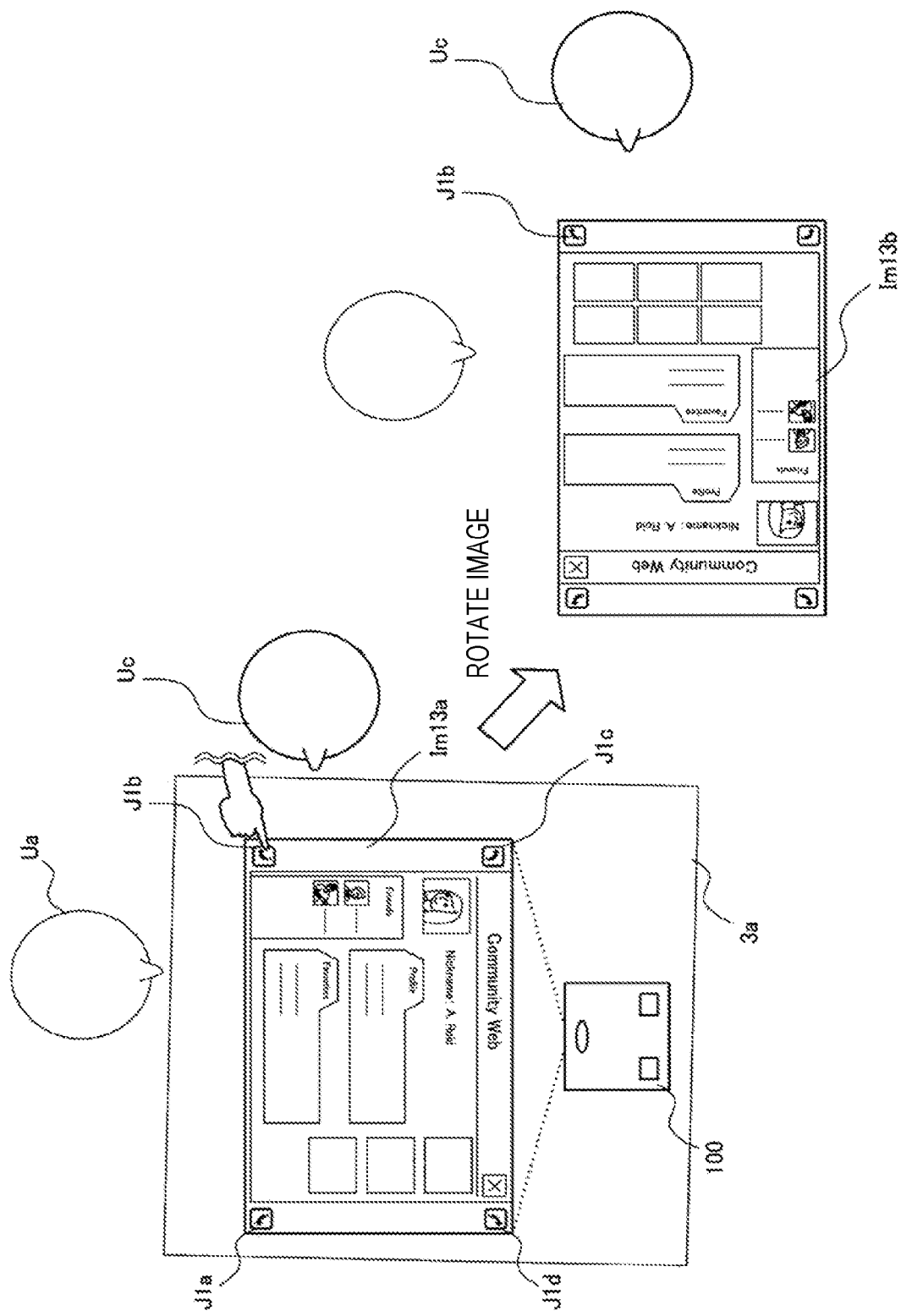
FIG. 13 is an illustrative diagram for describing an example of a user interface for rotating a projection image.

FIG. 13 is an illustrative diagram for describing an example of a rotation UI. Referring to the left part of FIG. 13, the projection control device 100 is placed on a table surrounded by two users. The projection control device 100 projects a projection image Im13a on the table surface 3a. The projection image Im13a is an image of a touch input adaptive web browser that operates on an operating system for mobile devices. Four corners of the projection image Im13a display buttons J1a, J1b, J1c, and J1d. These buttons J1a, J1b, J1c, and J1d are GUI items for rotating the projection image. When a user Uc taps the button J1b, for example, the first user input detection system 17 notifies the integrated control unit 160 of a touch event indicating that the position of the button J1b has been tapped. According to the notified touch event, the integrated control unit 160 rotates the display of the web browser clockwise by 90°. As a result, the projection image Im13a displaying a web page is projected in the direction appropriate for the user Uc to view the page as illustrated in the right part of FIG. 13.

When the rotation UI is a sound UI, a sound may be an acoustic sound or an utterance of a user. For example, an acoustic sound generated when a user taps the table may be used as a sound input for rotating the projection image. In addition, the second user input detection system 18 may determine in which direction the projection image should be rotated based on an incoming direction of a sound recognized using an array-type microphone.

[2-4. Input Condition that does not Depend on User Input]

In the non-touch mode, a touch input only with a low level of touch detection accuracy is possible, or a touch input is not possible. Thus, the integrated control unit 160 may cause the software module 140 to execute touch input non-adaptive software that changes a projection image based on an input condition that does not depend on a user input in order to enrich a user experience more in the non-touch mode. The input condition that does not depend on a user input referred to here may be a condition related to at least one of, for example, a date, a time, weather, an installation place of a projector, and a recognized user.

FIG. 14 is an illustrative diagram for describing an example of a projection image changing based on an input condition that does not depend on a user input. Referring to FIG. 14, the projection control device 100 is installed in front of the wall surface 3b in the second installation attitude. In the left part of FIG. 14, it is assumed that it is an afternoon time and the weather is fine. The integrated control unit 160 can ascertain the weather from, for example, weather data acquired from an external server via the communication interface 150. The integrated control unit 160 causes a projection image displaying a background expressing an outdoor state of a fine daytime to be projected on the wall surface 3b. In the right part of FIG. 14, it is assumed that it is a night time and the weather is cloudy. The integrated control unit 160 causes a projection image displaying a background expressing an outdoor state of a cloudy night to be projected on the wall surface 3b based on the input conditions indicated by the time and weather data.

The recognition module 120 may identify a user viewing a projection image using a known individual recognition technology such as face recognition, finger print authentication, iris authentication, or the like. When a calendar application or a clock application is executed in the non-touch mode, these applications may superimpose schedule information registered in advance for an identified user on an image of a calendar or a clock. In addition, the recognition module 120 may recognize an installation place of a projector based on a position measurement result input from a Global Positioning System (GPS) sensor or a positioning sensor such as PlaceEngine (registered trademark). An image of a calendar or a clock may be projected when, for example, the projection control device 100 is positioned in a living room of a house in the non-touch mode, and on the other hand, information of a recommended cooking recipe may be projected when the projection control device 100 is positioned in a kitchen.

<3. Process Flow>

In the present section, examples of flows of processes that can be executed by the above-described projection control device 100 will be described using several flowcharts. Note that, although a plurality of process steps are described in the flowcharts, the process steps may not be necessarily executed in that order shown in the flowcharts. Several process steps may be executed in a parallel manner. In addition, additional process steps may be adopted, and some of the process steps may be omitted.

[3-1. UI Control Process]

Figure 15:
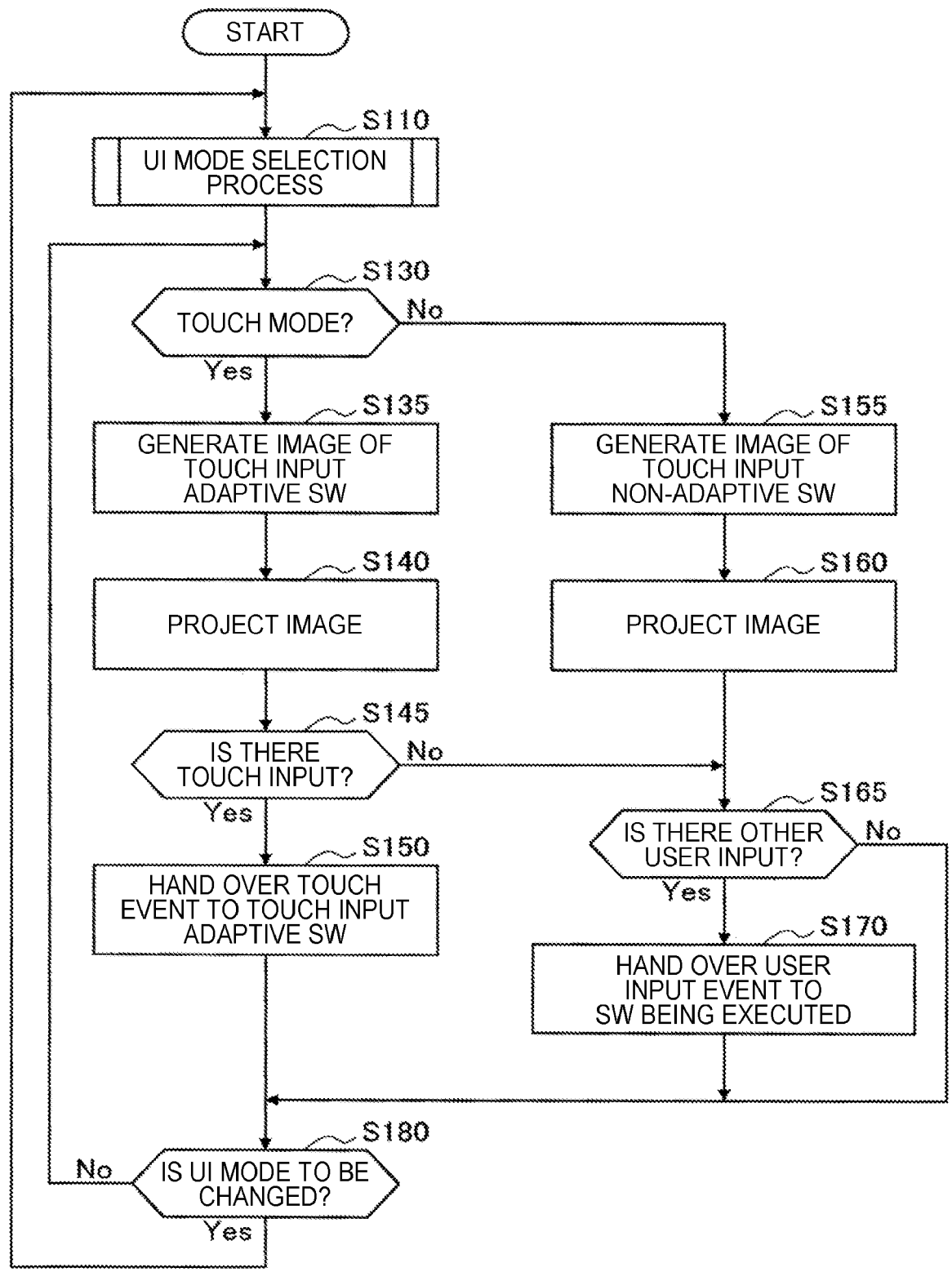
FIG. 15 is a flowchart showing an example of a flow of a user interface control process according to an embodiment of the present disclosure.

FIG. 15 is a flowchart showing an example of a flow of a user interface control process according to an embodiment. Here, the projector module 110 of the projection control device 100 is assumed to have already been activated.

Referring to FIG. 15, first, the integrated control unit 160 executes a UI mode selection process to select a UI mode based on positional relationships of the projection control device 100 with respect to the projection plane (Step S110). Several examples of the UI mode selection process executed here will be described below in more detail. The following processes are divided depending on whether the touch mode has been selected in the UI mode selection process (Step S130).

When the touch mode is selected as the UI mode, the software module 140 executes the touch input adaptive software 141, and generates an image of the touch input adaptive software 141 (Step S135) The projector module 110 projects the generated image of the touch input adaptive software 141 on the projection plane (Step S140).

Next, the integrated control unit 160 determines whether the first user input detection system 17 of the projector module 110 has detected a touch input (Step S145). When the first user input detection system 17 has detected a touch input, the integrated control unit 160 hands over a touch event notified by the first user input detection system 17 to the touch input adaptive software 141 being executed (Step S150). As a result, the touch input adaptive software 141 can execute a process according to the touch event (for example, reading a web page at a tapped link destination, or the like), and generate a new projection image. When no touch input has been detected, the process can proceed to Step S165.

When the non-touch mode is not selected as the UI mode in Step S110, the touch input non-adaptive software 143 is executed in the software module 140 and an image of the touch input non-adaptive software 143 is generated (Step S155). The projector module 110 projects the generated image of the touch input non-adaptive software 143 on the projection plane (Step S160).

Next, the integrated control unit 160 determines whether the second user input detection system 18 of the projector module 110 has detected other user input (Step S165). When any user input has been detected by the second user input detection system 18, the integrated control unit 160 hands over a user input event notified by the second user input detection system 18 to the software being executed (Step S170). As a result, a process corresponding to the user input event is executed by the software being executed, and thereby a new projection image can be generated.

Next, the integrated control unit 160 determines whether the UI mode is to be changed (Step S180). When, for example, a measurement result input from the sensor module 130 indicates that the attitude of the projection control device 100 or the depth of the projection plane has been changed, or when a user input instructing a change of the UI mode has been detected, the integrated control unit 160 may determine to change the UI mode. When the integrated control unit 160 has determined to change the UI mode, the user interface control process of FIG. 15 returns to Step S110. When the integrated control unit 160 has determined not to change the UI mode, the user interface control process of FIG. 15 returns to Step S130, and the generation and the projection of the image of the above-described software, and monitoring of a user input are repeated.

[3-2. UI Mode Selection Process]

(1) First Example

Figure 16:
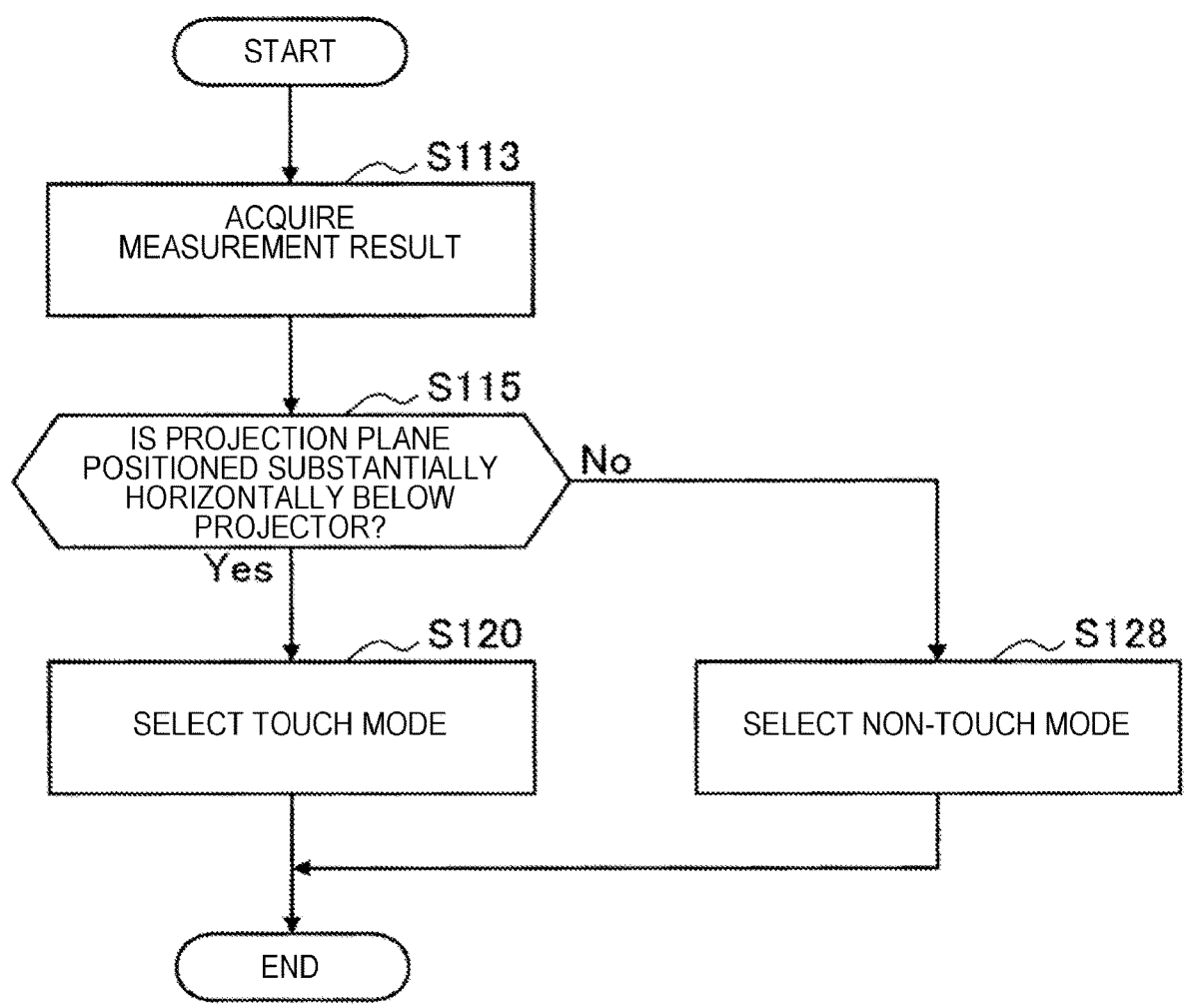
FIG. 16 is a flowchart showing a first example of a detailed flow of a UI mode selection process.

FIG. 16 is a flowchart showing a first example of a detailed flow of a UI mode selection process shown in FIG. 15. Referring to FIG. 16, first, the integrated control unit 160 acquires the measurement result of the positional relationships of the projection control device 100 with respect to the projection plane from the sensor module 130 (Step S113). Next, the integrated control unit 160 determines whether the projection plane is positioned substantially horizontally below the projection control device 100 based on the acquired measurement result (Step S115).

Then, when the projection plane is determined to be positioned substantially horizontally below the projection control device 100, the integrated control unit 160 selects the touch mode as the UI mode (Step S120). On the other hand, when it is not, the integrated control unit 160 selects the non-touch mode as its UI mode (Step S128).

(2) Second Example

Figure 17A:
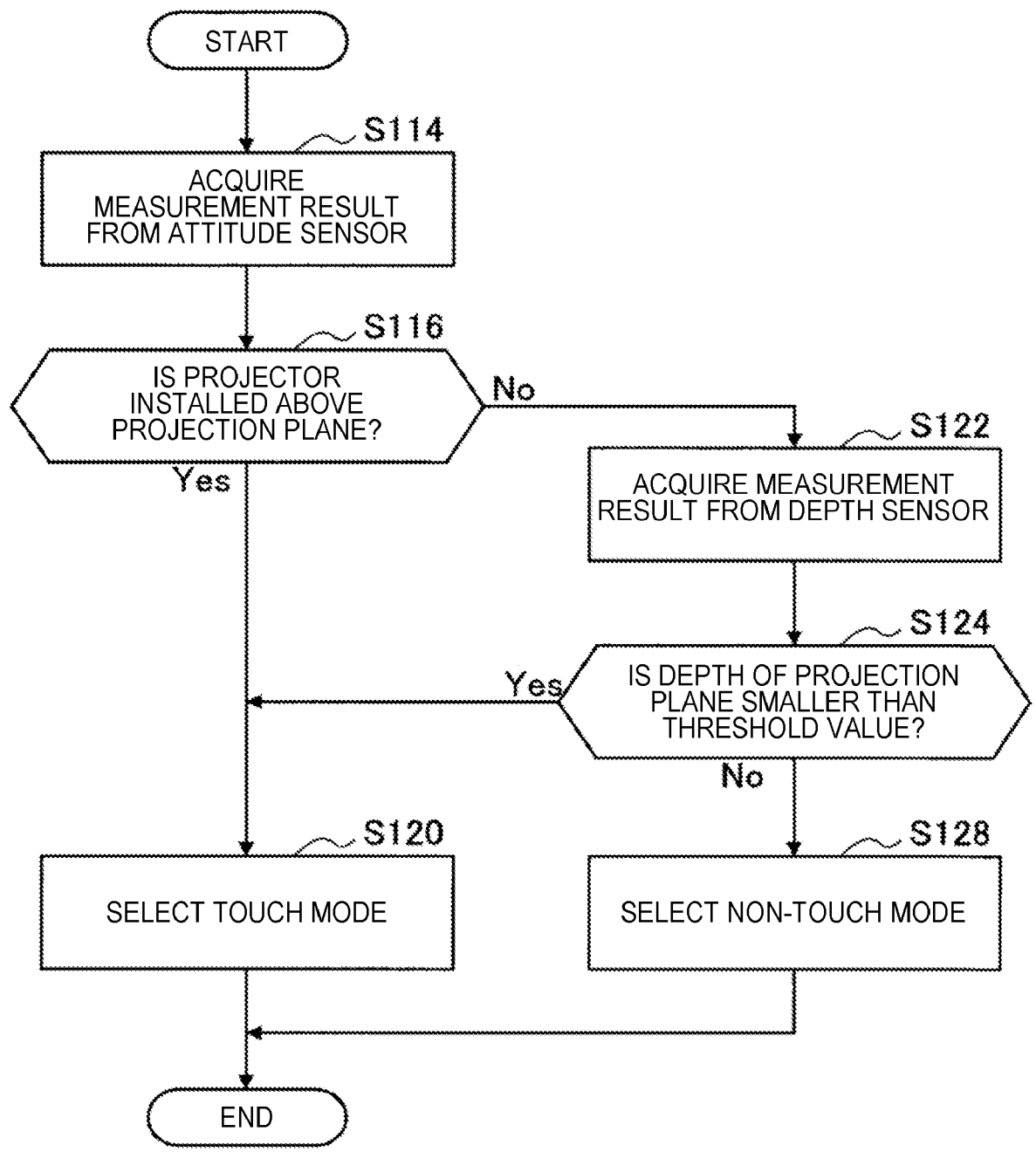
FIG. 17A is a flowchart showing a second example of a detailed flow of a UI mode selection process.

FIG. 17A is a flowchart showing a second example of a detailed flow of the UI mode selection process shown in FIG. 15. Referring to FIG. 17A, first, the integrated control unit 160 acquires the measurement result about an attitude of the projection control device 100 from the attitude sensor 131 (Step S114). Next, the integrated control unit 160 determines whether the projection control device 100 is installed above a projection plane based on the acquired measurement result (Step S116).

When, for example, the measurement result from the attitude sensor 131 indicates that the reference plane 10b is horizontal, the integrated control unit 160 can determine that the projection control device 100 is installed above the projection plane in the first installation attitude. When the projection control device 100 is determined to have been installed above the projection plane as described, the integrated control unit 160 selects the touch mode as the UI mode (Step S120).

On the other hand, when the measurement result from the attitude sensor 131 indicates that the reference plane 10b is not horizontal, for example, the integrated control unit 160 further acquires a measurement result indicating a depth of the projection plane from the depth sensor 133 (Step S122). Next, the integrated control unit 160 determines whether the distance between the search plane of the first user input detection system 17 and the projection plane (i.e., the depth of the projection plane) is smaller than a threshold value based on the acquired measurement result (Step S124). Then, when the depth of the projection plane is determined to be smaller than the threshold value, the integrated control unit 160 selects the touch mode as the UI mode (Step S120). On the other hand, when the depth of the projection plane is determined not to be smaller than the threshold value, the integrated control unit 160 selects the non-touch mode (Step S128).

(3) Third Example

Figure 17B:
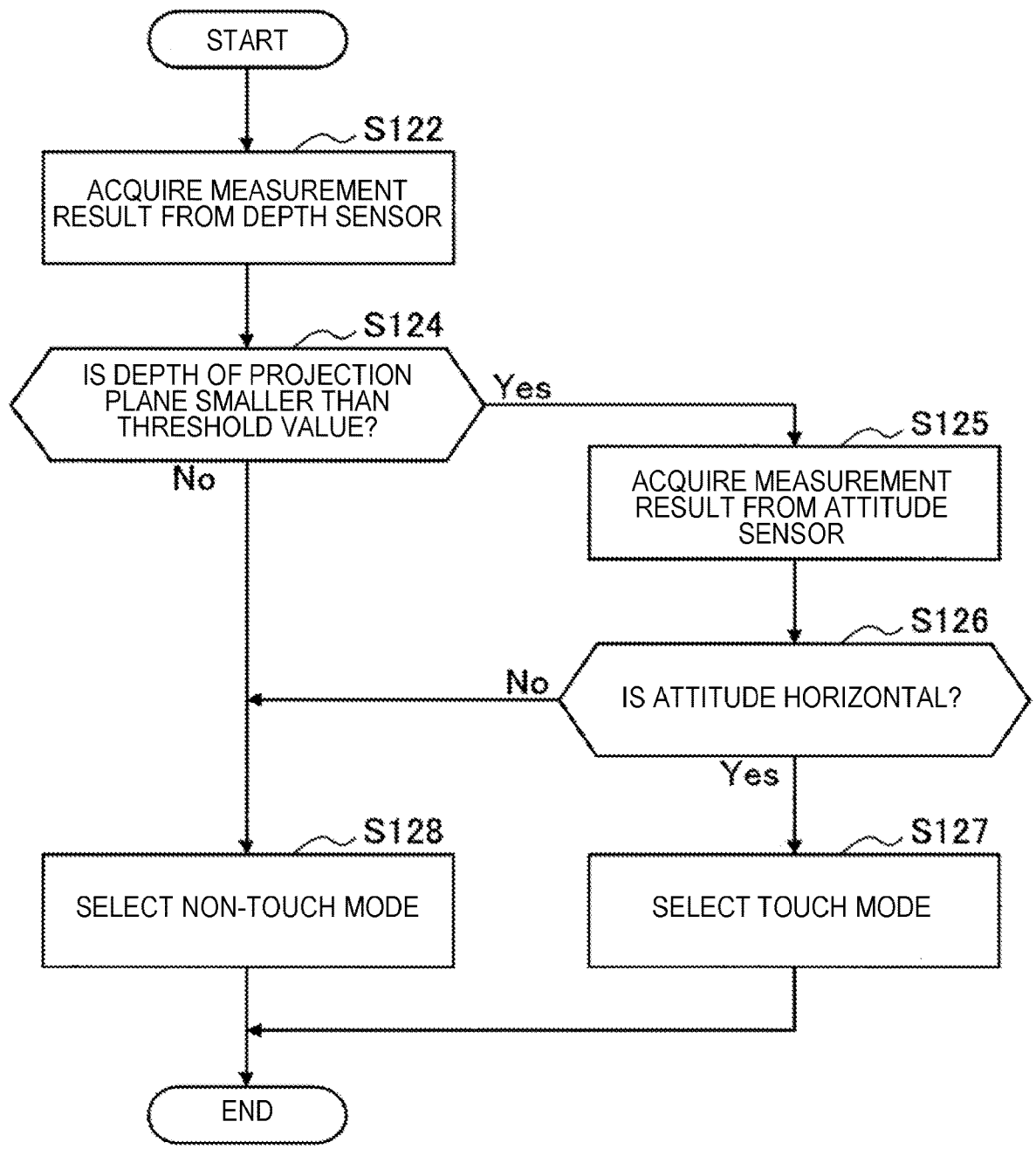
FIG. 17B is a flowchart showing a third example of a detailed flow of a UI mode selection process.

FIG. 17B is a flowchart showing a third example of a detailed flow of the UI mode selection process shown in FIG. 15. Referring to FIG. 17B, first, the integrated control unit 160 acquires a measurement result indicating a depth of the projection plane from the depth sensor 133 (Step S122). Next, the integrated control unit 160 determines whether the depth of the projection plane is smaller than a threshold value based on the acquired measurement result (Step S124) When the depth of the projection plane is determined not to be smaller than the threshold value, the integrated control unit 160 selects the non-touch mode (Step S128).

On the other hand, when the depth of the projection plane is determined to be smaller than the threshold value, the integrated control unit 160 further acquires a measurement result about an attitude of the projection control device 100 from the attitude sensor 131 (Step S125). Next, the integrated control unit 160 determines whether the reference plane 10b of the projection control device 100 is horizontal based on the measurement result from the attitude sensor 131 (Step S126).

Then, when the measurement result from the attitude sensor 131 indicates that the reference plane 10b is horizontal, the integrated control unit 160 selects the touch mode as the UI mode (Step S127). On the other hand, when the measurement result from the attitude sensor 131 indicates that the reference plane 10b is not horizontal, the integrated control unit 160 selects the non-touch mode as the UI mode (Step S128).

(4) Fourth Example

Figure 18:
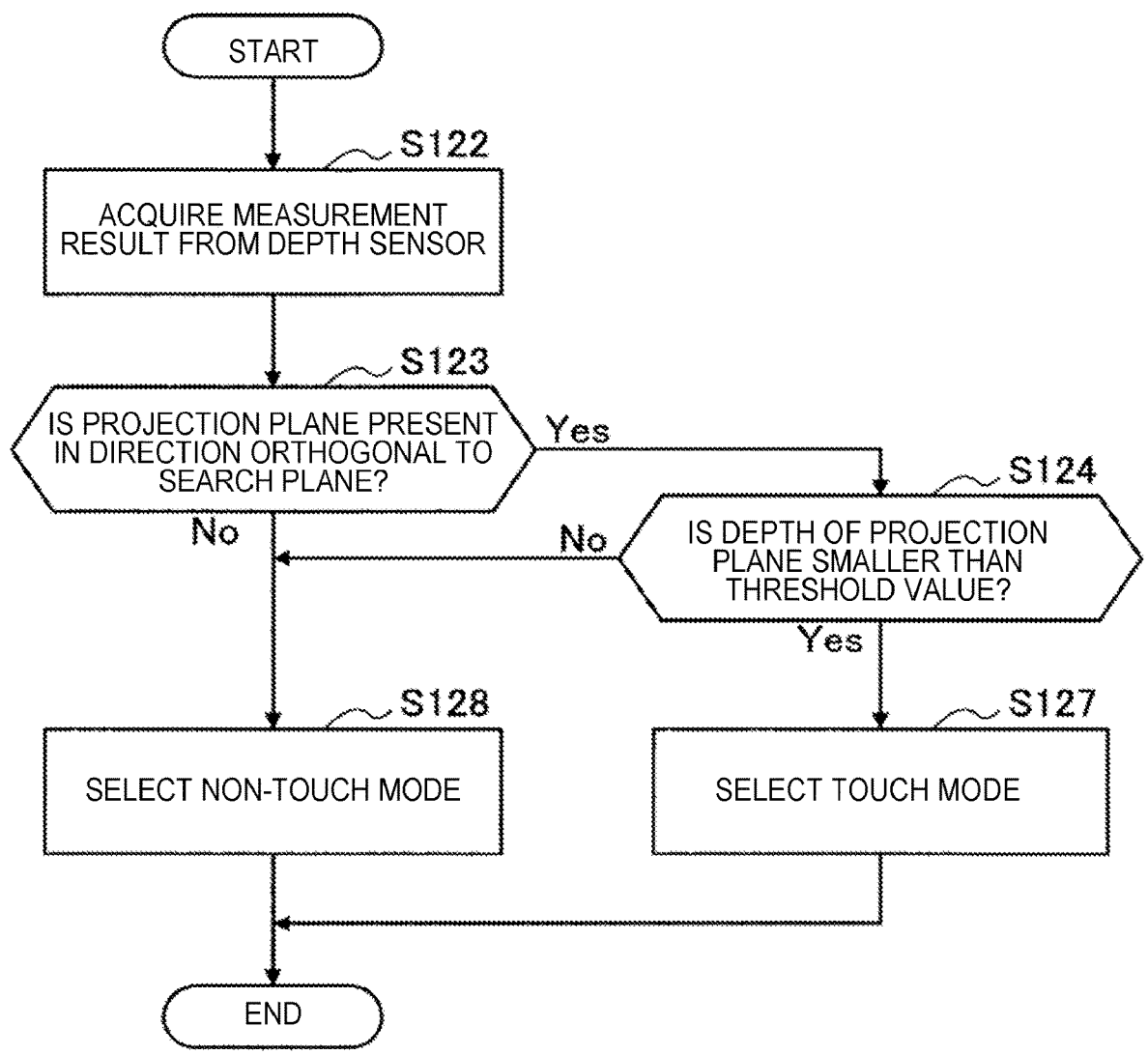
FIG. 18 is a flowchart showing a fourth example of a detailed flow of a UI mode selection process.

FIG. 18 is a flowchart showing a fourth example of a detailed flow of the UI mode selection process shown in FIG. 15. Referring to FIG. 18, first, the integrated control unit 160 acquires a measurement result indicating a depth of the projection plane from the depth sensor 133 of the sensor module 130 (Step S122) Next, the integrated control unit 160 determines whether the projection plane is present in a direction orthogonal to the search plane based on the acquired measurement result (Step S123). When the projection plane is not present in the direction orthogonal to the search plane, the integrated control unit 160 selects the non-touch mode as the UI mode (Step S128).

On the other hand, when the projection plane is present in the direction orthogonal to the search plane, the integrated control unit 160 determines whether the depth of the projection plane is smaller than the threshold value based on the measurement result acquired from the depth sensor 133 (Step S124). Then, when the depth of the projection plane is determined to be smaller than the threshold value, the integrated control unit 160 selects the touch mode as the UI mode (Step S127). On the other hand, when the depth of the projection plane is determined not to be smaller than the threshold value, the integrated control unit 160 selects the non-touch mode (Step S128).

(5) Fifth Example

All the first, second, third, and fourth examples described above are based on the premise that the integrated control unit 160 autonomously selects a UI mode using sensor data. However, when a user explicitly designates a UI mode, the UI mode designated by the user may be prioritized over a UI mode autonomously selected by the unit.

Figure 19:
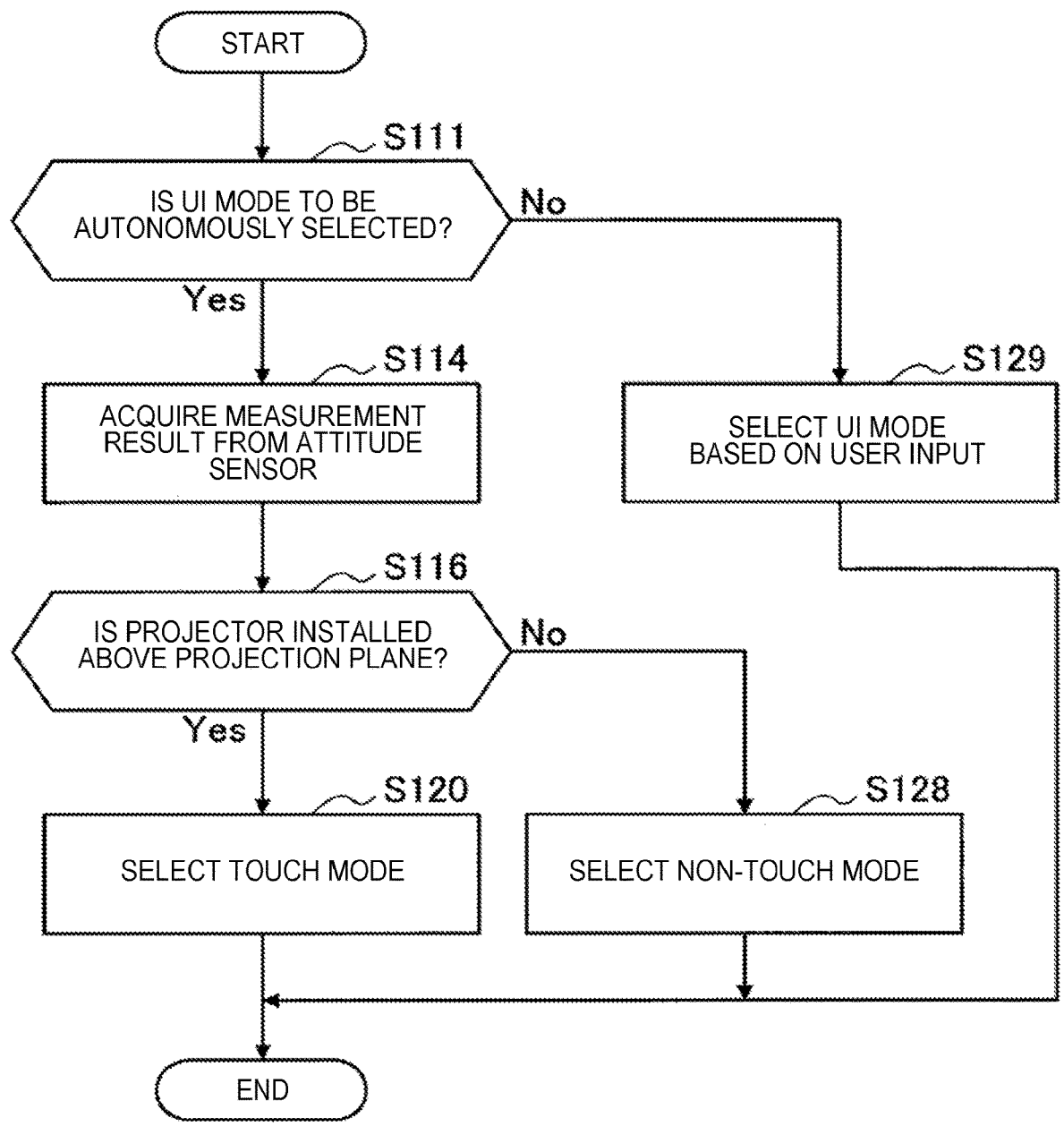
FIG. 19 is a flowchart showing a fifth example of a detailed flow of a UI mode selection process.

FIG. 19 is a flowchart showing a fifth example of a detailed flow of the UI mode selection process shown in FIG. 15. Referring to FIG. 19, first, the integrated control unit 160 determines whether a UI mode is to be autonomously selected (Step S111). When no user input to designate a UI mode is detected, for example, the integrated control unit 160 can determine to autonomously select a UI mode.

When the integrated control unit 160 has determined to autonomously select a UI mode, the unit acquires a measurement result about an attitude of the projection control device 100 from the attitude sensor 131 of the sensor module 130 (Step S114). Next, the integrated control unit 160 determines whether the projection control device 100 is installed above the projection plane based on the acquired measurement result (Step S116). When the projection control device 100 is determined to be installed above the projection plane, the integrated control unit 160 selects the touch mode as the UI mode (Step S120). On the other hand, when the projection control device 100 is determined not to be installed above the projection plane, the integrated control unit 160 selects the non-touch mode as the UI mode (Step S128).

In addition, when it is determined that a UI mode is not to be autonomously selected in Step S111, the integrated control unit 160 selects a UI mode based on a user input that can be detected through the first user input detection system 17 or the second user input detection system 18 (Step S129). Note that such selection of a UI mode based on a user input may be combined with any of the above-described first to fourth examples of the UI mode selection process.

<4. Conclusion>

So far, details of the embodiment of the technology related to the present disclosure have been described using FIGS. 1 to 19. According to the above-described embodiment, when the projector projects an image on a projection plane, a UI mode for a projection image is switched between two or more UI modes based on a positional relationship of the projector with respect to the projection plane. Thus, it is possible to provide a user with a user interface in a desirable scheme suitable for the positional relationship of the projector with respect to the projection plane. When, for example, there is a high possibility of an obstacle that is not a manipulation object obstructing detection of a touch when a user is attempting to touch the projection plane, smooth user interaction can be secured by primarily using a user input other than a touch input.

In addition, according to an embodiment, when a projection plane is positioned substantially horizontally below the projector, the first user input detection system that detects a touch input to the projection plane can be used as a primary input interface. For example, when a portable projector is placed on a horizontal surface like a table surface and projects an image on the table surface, this positional relationship can be easily inferred using an attitude sensor included in the projector. In this case, a mechanism which determines whether the projector and the projection plane are in a positional relationship suitable for touch input can be constructed using a small-sized attitude sensor at low cost.

In addition, according to an embodiment, the projector includes the first user input detection system that detects a position of a touch by a user using search light emitted toward a search area in the vicinity of the projector. The method of using search light can achieve a high level of touch detection accuracy by forming a search plane in the vicinity of a projection image to cover the projection image when the projector is in a specific positional relationship with respect to the projection plane. Thus, this method is appropriate for the above-described technique of switching UI modes based on a positional relationship of the projector with respect to the projection plane. By primarily using the first user input detection system only when the first user input detection system is determined to be capable of achieving a sufficient level of touch detection accuracy from the positional relationship, for example, it is possible to avoid degradation of user experience caused by deterioration of touch detection accuracy while taking advantage of convenience of the method in which search light is used as much as possible.

Furthermore, according to an embodiment, when the search plane formed in the above-described method of using search light is substantially orthogonal to an installation plane of the projector (in this case, if the installation plane is horizontal, the search plane is vertical and the projection plane is vertical as well), further determination based on a depth of the projection plane from the projector can be made. Then, when the depth of the projection plane is greater than a threshold value, the first user input detection system is determined not to achieve a sufficient level of touch detection accuracy, and thus the second user input detection system can be primarily used in place of the first user input detection system. Thus, it is possible in an application in which a user views and listens to content projected on a wall of a room in a large screen shape, for example, to provide the user with a user interface (for example, a gesture UI, a sound UI, a line-of-sight UI, or the like) fit to the application by precisely determining a difficulty for the user to touch the projection plane.

Moreover, according to an embodiment, the projector can selectively execute touch input adaptive software or touch input non-adaptive software depending on a selected UI mode. Thus, when the first user input detection system is determined to be capable of achieving a sufficient level of touch detection accuracy, execution of software designed to operate on mobile devices, for example, smartphones or tablet PCs is allowed, but when it is not, alternative software can be automatically executed.

Note that various processes described in the present specification may be realized using any of software, hardware, or a combination of software and hardware. A program constituting software is stored in, for example, a recording medium (a non-transitory medium) provided inside or outside of a device beforehand. In addition, each program is read by, for example, a RAM being executed and executed by a processor such as a CPU.

In addition, some of logical functions of a device described in the present specification may be implemented on a device present in a cloud computing environment, instead of being implemented on the aforementioned device. In that case, information exchanged between the logical functions can be transmitted or received via the communication interface exemplified in FIG. 7.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) A control device including:
a projection control unit configured to control projection of an image on a projection plane by a projector; and
a UI control unit configured to switch a mode of a user interface (UI) related to the projected image between two or more UI modes based on a positional relationship of the projector with respect to the projection plane.

(2) The control device according to (1),
wherein, when the projection plane is positioned substantially horizontally below the projector, the UI control unit selects a first UI mode in which a first user input detection system configured to detect a touch input to the projection plane is used as a primary input interface.

(3) The control device according to (1) or (2),
wherein the projector includes a first user input detection system configured to detect a position of a touch by a user using search light emitted toward a search area in the vicinity of the projector.

(4) The control device according to (3),
wherein, when the first user input detection system is determined to be capable of achieving a certain level of touch detection accuracy from the positional relationship, the UI control unit selects a first UI mode in which the first user input detection system is used as a primary input interface.

(5) The control device according to (4),
wherein the search area forms a search plane that is substantially parallel with an installation plane of the projector in a first installation attitude of the projector, and
when the projector is installed on the projection plane in the first installation attitude, the UI control unit determines that the first user input detection system is capable of achieving the level of touch detection accuracy.

(6) The control device according to any one of (3) to (5),
wherein the UI control unit determines the positional relationship of the projector with respect to the projection plane based on a first measurement result from an attitude sensor of the projector.

(7) The control device according to (6),
wherein, when the first measurement result from the attitude sensor indicates that a search plane formed by the search area is substantially horizontal, the UI control unit selects a first UI mode in which the first user input detection system is used as a primary input interface.

(8) The control device according to (5),
wherein the search area forms a search plane that is substantially orthogonal to an installation plane of the projector in a second installation attitude of the projector, and
when the projector is installed in the second installation attitude and a depth of the projection plane is greater than a threshold value, the UT control unit determines that the first user input detection system is not capable of achieving the level of touch detection accuracy.

(9) The control device according to (8),
wherein the UI control unit acquires a depth of the projection plane based on a second measurement result from a depth sensor of the projector.

(10) The control device according to any one of (2) to (9),
wherein the projector further includes a second user input detection system configured to have lower touch detection accuracy than the first user input detection system or to be incapable of detecting a touch, and
the UI control unit uses the second user input detection system as a primary input interface in a second UI mode in which the first user input detection system is not primarily used.

(11) The control device according to (10),
wherein the second user input detection system detects one or more of a gesture, a sound, and a line of sight of a user as a user input.

(12) The control device according to (11),
wherein the projector further includes a camera that has an angle of view toward a direction in which a user is assumed to be present when the second UI mode is selected, and
the second user input detection system detects a user input based on an input of an image from the camera.

(13) The control device according to any one of (2) to (12),
wherein the projector projects an image of touch input adaptive software or touch input non-adaptive software that is selectively executed on the projection plane, and
the touch input adaptive software is executed in the first UI mode in which the first user input detection system is primarily used.

(14) The control device according to (13),
wherein the touch input adaptive software includes one or more of touch input adaptive basic software and touch input adaptive application software.

(15) The control device according to (13) or (14),
wherein the touch input non-adaptive software changes a projection image based on an input condition that does not depend on a user input.

(16) The control device according to (15),
wherein the input condition that does not depend on a user input relates to at least one of a date, a time, weather, an installation place of the projector, and a recognized user.

(17) The control device according to any one of (1) to (16),
wherein, when the projection plane is determined to be substantially horizontal, the UI control unit enables a UI for rotating a projection image.

(18) The control device according to (17),
wherein the UI for rotating the projection image includes one or more of a GUI displayed together with the image and a sound UI.

(19) A control method for a projection control device configured to control projection of an image on a projection plane by a projector, the control method including:
switching a mode of a user interface (UI) related to the projected image between two or more UI modes based on a positional relationship of the projector with respect to the projection plane.

(20) A program for causing a processor of a projection control device to function as:
a projection control unit configured to control projection of an image on a projection plane by a projector; and
a UI control unit configured to switch a mode of a user interface (UI) related to the projected image between two or more UI modes based on a positional relationship of the projector with respect to the projection plane.

What is claimed is:

1. A control device comprising:
a housing having an emission surface, wherein the emission surface includes a projection light opening for a projector, and wherein the housing includes circuitry configured to
control projection of an image on a projection plane by the projector;
determine a positional relationship of the projector with respect to the projection plane based on a first measurement result from an attitude sensor of the projector; and
switch a mode of a user interface (UI) related to the projected image between a first UI mode using a first user input detection system configured to detect a touch input to the projection plane and a second UI mode using a second user input detection system configured to detect another input by the user without using the first user input detection system based on the first measurement result,
wherein the projector includes the first user input detection system configured to detect a position of a touch by a user using a search light emitted toward a search area in the vicinity of the projector,
wherein, when the first user input detection system is determined to be capable of achieving a certain level of touch detection accuracy from the positional relationship, the circuitry selects the first UI mode in which the first user input detection system is used as a primary input interface,
wherein, when the projection plane is determined to be substantially horizontal, the UI control unit enables a UI for rotating a projection image,
wherein the projector projects an image of touch input adaptive software or touch input non-adaptive software that is selectively executed on the projection plane,
wherein the touch input non-adaptive software changes a projection image based on an input condition that does not depend on a user input, and
wherein the input condition that does not depend on a user input relates to at least one of a date, a time, weather, and an installation place of the projector.

2. The control device according to claim 1,
wherein, when the projection plane is positioned substantially horizontally below the projector, the circuitry selects a first UI mode in which a first user input detection system configured to detect a touch input to the projection plane is used as a primary input interface.

3. The control device according to claim 2,
wherein the projector further includes a second user input detection system configured to have lower touch detection accuracy than the first user input detection system or to be incapable of detecting a touch, and
the circuitry uses the second user input detection system as a primary input interface in the second UI mode in which the first user input detection system is not primarily used.

4. The control device according to claim 3,
wherein the second user input detection system detects one or more of a gesture and a sound.

5. The control device according to claim 2,
wherein
the touch input adaptive software is executed in the first UI mode in which the first user input detection system is primarily used.

6. The control device according to claim 5,
wherein the touch input adaptive software includes one or more of touch input adaptive basic software and touch input adaptive application software.

7. The control device according to claim 1,
wherein the search area forms a search plane that is substantially parallel with an installation plane of the projector in a first installation attitude of the projector, and
when the projector is installed above the projection plane in the first installation attitude, the circuitry determines that the first user input detection system is capable of achieving the level of touch detection accuracy.

8. The control device according to claim 7,
wherein the search area forms a search plane that is substantially orthogonal to an installation plane of the projector in a second installation attitude of the projector, and
when the projector is installed in the second installation attitude and a depth of the projection plane is greater than a threshold value, the circuitry determines that the first user input detection system is not capable of achieving the level of touch detection accuracy.

9. The control device according to claim 8,
wherein the circuitry acquires a depth of the projection plane based on a second measurement result from a depth sensor of the projector.

10. The control device according to claim 1,
wherein, when the first measurement result from the attitude sensor indicates that a search plane formed by the search area is substantially horizontal, the circuitry selects the first UI mode in which the first user input detection system is used as the primary input interface.

11. The control device according to claim 1,
wherein the UI for rotating the projection image includes one or more of a GUI displayed together with the image and a sound UI.

12. The control device according to claim 1,
wherein the attitude sensor is at least one of an acceleration sensor and a gyro sensor, and the attitude sensor measures a tilting angle of the projector with respect to a reference attitude of the projector, and
the circuitry selects the first UI mode when the first measurement result from the attitude sensor indicates that the projector is posited substantially horizontally below the projection plane, and selects the second UI mode when the first measurement result indicates that the projector is posited substantially non-horizontally below the projection plane.

13. The control device according to claim 1,
wherein when the attitude of the control device is such that the emission surface serves as a top surface of the control device, the mode of the user interface that is used is the second UI mode.

14. The control device according to claim 1, wherein, during the second UI mode, the circuitry is configured to detect a line-of-sight input as a user input by recognizing a motion of the eyes of a user appearing in a captured image input from a camera.

15. The control device according to claim 1, wherein the UI for rotating the projection image is a button icon that is displayed in the projection plane, and when the button icon is pressed once by a user, the projection plane rotates 90 degrees.

16. A control method for a projection control device configured to control projection of an image on a projection plane by a projector, the projection control device including a housing having an emission surface wherein the emission surface includes a projection light opening for a projector, the control method comprising:
- determining a positional relationship of the projector with respect to the projection plane based on a first measurement result from at least one attitude sensor of the projector; and
- switching a mode of a user interface (UI) related to the projected image between a first UI mode using a first user input detection system configured to detect a touch input to the projection plane and a second UI mode using a second user input detection system configured to detect another input by the user without using the first user input detection system based on the first measurement result,
- wherein the projector includes a first user input detection system configured to detect a position of a touch by a user using a search light emitted toward a search area in the vicinity of the projector,
- wherein, when the first user input detection system is determined to be capable of achieving a certain level of touch detection accuracy from the positional relationship, selecting the first UI mode in which the first user input detection system is used as a primary input interface,
- wherein, when the projection plane is determined to be substantially horizontal, the UI control unit enables a UI for rotating a projection image,
- wherein the projector projects an image of touch input adaptive software or touch input non-adaptive software that is selectively executed on the projection plane,
- wherein the touch input non-adaptive software changes a projection image based on an input condition that does not depend on a user input, and
- wherein the input condition that does not depend on a user input relates to at least one of a date, a time, weather, and an installation place of the projector.

17. The control method according to claim 16, wherein the second user input detection system detects at least one of a gesture input and sound input.

18. A non-transitory computer readable medium storing a program for causing a processor of a projection control device to function as:
- circuitry configured to
- control projection of an image on a projection plane by a projector;
- determine a positional relationship of the projector with respect to the projection plane based on a first measurement result from an attitude sensor of the projector; and
- switch a mode of a user interface (UI) related to the projected image between a first UI mode using a first user input detection system configured to detect a touch input to the projection plane and a second UI mode using a second user input detection system configured to detect another input by the user without using the first user input detection system based on the first measurement result,
- wherein the projector includes a first user input detection system configured to detect a position of a touch by a user using a search light emitted toward a search area in the vicinity of the projector,
- wherein, when the first user input detection system is determined to be capable of achieving a certain level of touch detection accuracy from the positional relationship, selecting the first UI mode in which the first user input detection system is used as a primary input interface,
- wherein, when the projection plane is determined to be substantially horizontal, the UI control unit enables a UI for rotating a projection image,
- wherein the projector projects an image of touch input adaptive software or touch input non-adaptive software that is selectively executed on the projection plane,
- wherein the touch input non-adaptive software changes a projection image based on an input condition that does not depend on a user input, and
- wherein the input condition that does not depend on a user input relates to at least one of a date, a time, weather, and an installation place of the projector.

* * * * *